United States Patent
Suzuki et al.

(10) Patent No.: US 8,163,221 B2
(45) Date of Patent: Apr. 24, 2012

(54) PROCESS FOR PRODUCING REINFORCING FIBER MOLDING

(75) Inventors: Tamotsu Suzuki, Otsu (JP); Masatoshi Tsukamoto, Iyo-gun (JP); Nobuo Asahara, Nagoya (JP)

(73) Assignee: Toray Industries, Inc., Tokyo (JP)

( * ) Notice: Subject to any disclaimer, the term of this patent is extended or adjusted under 35 U.S.C. 154(b) by 461 days.

(21) Appl. No.: 12/281,692

(22) PCT Filed: Mar. 8, 2007

(86) PCT No.: PCT/JP2007/054514
§ 371 (c)(1),
(2), (4) Date: Sep. 4, 2008

(87) PCT Pub. No.: WO2007/102573
PCT Pub. Date: Sep. 13, 2007

(65) Prior Publication Data
US 2009/0065977 A1    Mar. 12, 2009

(30) Foreign Application Priority Data
Mar. 8, 2006 (JP) .................. 2006-062427

(51) Int. Cl.
*B29C 53/00* (2006.01)
*B29C 55/00* (2006.01)

(52) U.S. Cl. ........ 264/285; 264/257; 264/258; 264/294; 264/295; 264/296; 264/339; 270/41

(58) Field of Classification Search ........................ None
See application file for complete search history.

(56) References Cited

U.S. PATENT DOCUMENTS

| | | | |
|---|---|---|---|
| 4,151,031 A | 4/1979 | Goad et al. | |
| 5,820,804 A * | 10/1998 | Elmaleh | 264/167 |
| 6,592,795 B2 * | 7/2003 | Kasai et al. | 264/241 |
| 6,701,990 B1 * | 3/2004 | Burley et al. | 156/463 |
| 2005/0029707 A1 * | 2/2005 | Kasai et al. | 264/258 |

FOREIGN PATENT DOCUMENTS

| | | |
|---|---|---|
| JP | 01-285315 | 11/1989 |
| JP | 3628965 B | 5/2000 |
| JP | 2001-191418 A | 7/2001 |
| JP | 2005-324513 A | 11/2005 |
| JP | 2006-233120 | 9/2006 |

OTHER PUBLICATIONS

International Search Report for International Application No. PCT/JP2007/054514 dated Jun. 12, 2007.

* cited by examiner

*Primary Examiner* — Christina Johnson
*Assistant Examiner* — Benjamin Schiffman
(74) *Attorney, Agent, or Firm* — RatnerPrestia

(57) ABSTRACT

A method of forming, on a strip-shaped laminate of multiple reinforcing fiber sheets superimposed one upon another, two flexures with respect to the cross-section configuration thereof, wherein in the forming of the two flexures with the use of two flexure forming dies independent from each other, respectively, the two flexure forming dies are arranged so that the relative distance of the two flexure forming dies is changeable in the direction perpendicular to the longitudinal direction of the strip-shaped laminate. This method can be effectively utilized in the production of a reinforcing fiber molding with changing of the distance between the two flexures namely, width of web portion or gauge between two flange portions from the strip-shaped laminate, or the production of fiber reinforced resin (FRP) molding therefrom.

12 Claims, 13 Drawing Sheets

PROCESS FOR PRODUCING REINFORCING FIBER MOLDING

This is a U.S. National Phase application of application number PCT/JP2007/054514, filed Mar. 8, 2007 (which is incorporated herein by reference in its entirety), which claims priority benefit of JP 2006-062427 filed Mar. 8, 2006.

TECHNICAL FIELD

The present invention relates to a method and apparatus for producing a reinforcing fiber molding.

BACKGROUND OF THE INVENTION

Reinforcing fiber moldings are known, and it is also known that they are used for producing fiber-reinforced plastic (FRP) moldings. A reinforcing fiber molding is formed of a strip-like laminate comprising layered multiple reinforcing fiber sheets and a laminate maintaining material for maintaining the layered state.

The fibers used to form the reinforcing fiber sheets include carbon fibers, glass fibers, aramid fibers, etc.

A known laminate maintaining material is a thermoplastic resin dispersedly deposited in the reinforcing fiber sheets. Stitch yarns for sewing multiple reinforcing fiber sheets together are also known. The reinforcing fiber sheets using any of these laminate maintaining materials is usually called a dry fabric. Further, as a laminate maintaining material, an uncured thermosetting resin impregnated as a matrix into the reinforcing fiber sheets is known, and the reinforcing fiber sheets using the laminate maintaining material is usually called a prepreg.

A reinforcing fiber molding formed of a laminate of dry fabric sheets is usually called a preform. It is known that the preform is impregnated with a flowable resin as a matrix, which is then solidified to produce a fiber-reinforced plastic (FRP) molding.

It is known that in a reinforcing fiber molding formed of a laminate of prepreg sheets, the uncured thermosetting resin in the laminate is cured to produce a fiber-reinforced plastic (FRP) molding.

A reinforcing fiber molding formed of a laminate of dry fabric sheets and having one or more bent portions in the cross sectional form, and a reinforcing fiber molding formed of a laminate of prepreg sheets and having one or more bent portions in the cross-sectional form are known. A fiber-reinforced plastic (FRP) molding having one or more bent portions produced from any of these reinforcing fiber moldings is often used as a structural material of a motor vehicle or aircraft.

A reinforcing fiber molding or a fiber-reinforced plastic (FRP) molding respectively having one bent portion is usually called an L-shaped molding, and a molding having two bent portions is called a C-shaped (U-shaped) or Z-shaped molding. A molding having three bent portions is called a J-shaped molding, and a molding having four bent portions is called an I-shaped (H-shaped) molding.

The invention relates to a method and apparatus for producing a long reinforcing fiber molding which molding has at least two bent portions in the cross sectional form, to have bent surfaces extending in the longitudinal direction.

Methods and apparatuses for producing a long reinforcing fiber molding having at least two bent portions in the cross sectional form, to have bent surfaces extending in the longitudinal direction are disclosed in Patent Literatures 1 and 2.

In the method for producing a reinforcing fiber molding disclosed in Patent Literature 1, as shown in FIG. 5 thereof, in order to form two left and right bent portions in the cross sectional form of an upper strip-like reinforcing fiber sheet 2A (dry fabric), a transforming machine 23 uses a left inner guide roller 35 for forming the left bent portion and a right inner guide roller 35 for forming the right bent portion. However, the left and right inner guide rollers 35 and 35 exist at quite the same positions in the direction for carrying the reinforcing fiber sheet 2A, and the distance between the left inner guide roller 35 and the right inner guide roller 35 in the width direction of the reinforcing fiber sheet 2A is fixed to be constant. That is, the positions of the left inner guide roller 35 and the right inner guide roller 35 in the longitudinal direction of the reinforcing fiber sheet 2A remain the same, and the distance between the left inner guide roller 35 and the right inner guide roller 35 in the width direction of the reinforcing fiber sheet 2A, that is, the gauge remains constant.

Therefore, this production method does not allow the production of a reinforcing fiber molding in which the width of the web portion existing between the two adjacent left and right bent portions changes in the longitudinal direction. For example, a reinforcing fiber molding in which the distance between the flange portion projecting vertically via the left bent portion of the horizontal web portion and the flange portion projecting vertically via the right bent portion of the web portion changes like a taper in the longitudinal direction cannot be produced.

Meanwhile, in the production of a motor vehicle or aircraft, there is a demand for a girder in which the distance between the adjacent bent portions (the width or height of the web portion) changes in the longitudinal direction of a fiber-reinforced plastic (FRP) molding. To meet the demand, as a conventional method, a mold having a desired shape over the entire length in the longitudinal direction in which the distance between the bent portions changes in the longitudinal direction is prepared, and a strip-like laminate comprising reinforcing fiber sheets and a laminate maintaining material is pressed against the mold, to be shaped by the mold, for producing a reinforcing fiber molding. However, this molding method has a disadvantage that the production efficiency is low.

In the method for producing a reinforcing fiber molding disclosed in Patent Literature 2, as shown in FIG. 9 thereof, in order to form two left and right bent portions in the cross sectional form of an upper strip-like reinforcing fiber sheet 260 (prepreg), a hot press device 400 uses an upper mold part 420 for molding the left bent portion and the right bent portion. The upper mold part 420 allows the left bent portion and the right bent portion to be molded simultaneously. That is, at quite the same positions in the direction for carrying the strip-like reinforcing fiber sheet 250 with the distance between both the flange portions, that is, the gauge kept constant, the two bent portions are molded. Therefore, this production method has quite the same disadvantage as that of the reinforcing fiber molding production method disclosed in the abovementioned Patent Literature 1.

CITATION LIST

Patent Literature 1: JP 2005-324513 A
Patent Literature 2: JP 2001-191418 A

SUMMARY OF INVENTION

The invention provides a method for producing a long reinforcing fiber molding at good production efficiency. The invention provides a method for producing a long reinforcing fiber molding in a short time at low cost, which can be used for producing a fiber-reinforced plastic (FRP) molding in which the distance between two bent portions (the width or height of the web portion) changes in the longitudinal direction.

(1) A method for producing a reinforcing fiber molding obtained by molding a strip-like laminate comprising layered multiple reinforcing fiber sheets and a laminate maintaining material for maintaining the layered state, which molding has at least two bent portions in the sectional form perpendicular to the longitudinal direction of the strip-like laminate, has a web portion formed between the ends of the adjacent bent portions, and has at least two flange portions protruding from the web portion via the bent portions, comprising:

(a) a supplying step of supplying the strip-like laminate, (b) a bent portion producing step of producing the at least two bent portions in the strip-like laminate supplied from the supplying step, and (c) a carrying step of intermittently carrying the strip-like laminate located continuously in the region from the supplying step to the bent portion producing step, wherein (d) the bent portion producing step comprises respectively independent at least two bent portion molding steps provided at different positions in the direction for carrying the strip-like laminate, (e) the at least two bent portion molding steps include a first bent portion molding step positioned on the upstream side and a second bent portion molding step positioned downstream of the first bent portion molding step, and (f) the first bent portion molding step molds at least one bent portion of the at least two bent portions, and the second bent portion molding step molds at least one bent portion of the at least two bent portions other than the bent portion molded by the first bent portion molding step.

This production method allows two different bent portions to be molded separately on the upstream side and on the downstream side in a production process. Therefore, the degree of freedom in selecting the molds for molding the bent portions increases in the case where a reinforcing fiber molding narrow in the width between the two bent portions is produced.

(2) A method for producing a reinforcing fiber molding, as described above, wherein the first bent portion molding step and/or the second bent portion molding step includes an inter-bent-portion distance changing step of letting the distance between at least two bent portions in the sectional form change in the longitudinal direction of the strip-like laminate.

This production method allows the production of a reinforcing fiber molding in which the distance between the bent portions, the height (width) of the web portion, or the distance (height) between the flange portions, that is, the gauge changes in the longitudinal direction.

(3) A method for producing a reinforcing fiber molding obtained by molding a strip-like laminate comprising layered multiple reinforcing fiber sheets and a laminate maintaining material for maintaining the layered state, which molding has at least two bent portions in the sectional form perpendicular to the longitudinal direction of the strip-like laminate, has a web portion formed between the ends of the adjacent bent portions, and has at least two flange portions protruding from the web portion via the bent portions, comprising:

(a) a supplying step of supplying the strip-like laminate, (b) a bent portion producing step of producing the at least two bent portions in the strip-like laminate supplied from the supplying step, and (c) a carrying step of intermittently carrying the strip-like laminate located continuously in the region from the supplying step to the bent portion producing step, wherein (d) the bent portion producing step comprises respectively independent at least two bent portion molding steps provided at the same positions in the direction for carrying the strip-like laminate, (e) the at least two bent portion molding steps include a first bent portion molding step positioned on one end side in the width direction of the strip-like laminate and a second bent portion molding step positioned on the other end side in the width direction of the strip-like laminate, and the first bent portion molding step and/or the second bent portion molding step includes an inter-bent-portion distance changing step of letting the distance between at least two bent portions in the sectional form change in the longitudinal direction of the strip-like laminate, and (f) the first bent portion molding step molds at least one bent portion of the at least two bent portions, and the second bent portion molding step molds at least one bent portion of the at least two bent portions other than the bent portion molded by the first bent portion molding step.

This production method allows the production of a reinforcing fiber molding in which the distance between the bent portions, the height (width) of the web portion, or the distance (height) between the flange portions, that is, the gauge changes in the longitudinal direction, like the production method described in the above item (2). For example, depending on the size of the mold for molding the first bent portion or the size of the mold for molding the second bent portion, whether this production method or the production method described in the above item (2) should be used can be decided.

(4) A method for producing a reinforcing fiber molding, as described above, wherein the distance between the bent portions changes like a taper in the longitudinal direction of the strip-like laminate.

This production method allows the production of a reinforcing fiber molding in which the distance between the bent portions, the height (width) of the web portion or the distance (height) between the flange portions, that is, the gauge changes like a taper in the longitudinal direction.

(5) A method for producing a reinforcing fiber molding, as described above, wherein the first bent portion molding step and the second bent portion molding step mold the bent portions of the strip-like laminate in such a manner that the two flange portions of the reinforcing fiber molding of two in the number of the bent portions protrude in the same direction in reference to the web portion.

This production method allows the production of a reinforcing fiber molding C-shaped (U-shaped) in cross sectional form, in addition to having the abovementioned advantages.

(6) A method for producing a reinforcing fiber molding, as described above, wherein the first bent portion molding step and the second bent portion molding step mold the bent portions of the strip-like laminate in such a manner that the two flange portions of the reinforcing fiber molding of two in the number of the bent portions protrude in different directions in reference to the web portion.

This production method allows the production of a reinforcing fiber molding Z-shaped in cross sectional form, in addition to having the abovementioned advantages.

(7) A method for producing a reinforcing fiber molding, as described above, comprising an edge separating step wherein an edge of the strip-like laminate, positioned outside the region where the bent portions are molded, is separated in the thickness direction into upper and lower layers, to form two flange portions turned respectively in the other directions, is provided upstream of the first bent portion molding step or upstream of the second bent portion molding step.

This production method allows the production of a reinforcing fiber molding J-shaped in cross sectional form, in addition to having the abovementioned advantages.

(8) A method for producing a reinforcing fiber molding, as described above, comprising one each edge separating step wherein an edge of the strip-like laminate, positioned outside the region where the bent portions are molded, is separated in the thickness direction into upper and lower layers, to form two flange portions turned respectively in the other directions, is provided upstream of the first bent portion molding step and upstream of the second bent portion molding step.

This production method allows the production of a reinforcing fiber molding I-shaped (H-shaped) in cross sectional form, in addition to having the abovementioned advantages.

(9) A method for producing a reinforcing fiber molding, as described in said the above item (7), wherein a corner filler supplying step in which a corner filler formed of a reinforcing fiber bundle is supplied in synchronization with the carrying of the strip-like laminate, to the branch corner formed by separating an edge of the strip-like laminate and supplied from the edge separating step, for positioning the corner filler at the branch corner, and an outer flange member supplying step in which an outer flange member formed of a strip-like laminate different from the strip-like laminate is supplied in synchronization with the carrying of the strip-like laminate, to cover the outer surfaces of the two flange portions and the outside of the corner filler positioned at the branch corner, are provided.

This production method allows the production of a reinforcing fiber molding J-shaped in cross sectional form and having other flange portions and a corner filler outside, in addition to having the abovementioned advantages.

(10) A method for producing a reinforcing fiber molding, as described in the above item (8), wherein corner filler supplying steps in each of which a corner filler formed of a reinforcing fiber bundle is supplied in synchronization with the carrying of the strip-like laminate, to the branch corner formed by separating an edge of the strip-like laminate and supplied from the edge separating step, for positioning the corner filler at the branch corner, and outer flange member supplying steps in each of which an outer flange member formed of a strip-like laminate different from the strip-like laminate is supplied in synchronization with the carrying of the strip-like laminate, to cover the outer surfaces of the two flange portions and the outside of the corner filler positioned at the branch corner, are provided.

This production method allows the production of a reinforcing fiber molding I-shaped (H-shaped) in cross sectional form and having other flange portions and corner fillers outside, in addition to having the abovementioned advantages.

(11) A method for producing a reinforcing fiber molding, as described above, wherein a web heating and pressurizing step for heating and pressurizing such a region of the strip-like laminate, as destined to be the web portion, is provided upstream of the first bent portion molding step.

This production method allows the production of a reinforcing fiber molding free from the deformation of the web portion during molding, in addition to having the abovementioned advantages.

(12) A method for producing a reinforcing fiber molding, as described above, wherein the reinforcing fiber sheets are dry fabric sheets containing the laminate maintaining material composed of a thermoplastic resin dispersedly deposited in the reinforcing fiber sheets; the strip-like laminate is formed of a laminate of the multiple dry fabric sheets; and the produced reinforcing fiber molding is a preform that is later impregnated with a resin, for producing a fiber-reinforced composite material.

This production method allows the production of a reinforcing fiber molding formed of dry fabric sheets, namely, a preform, in addition to having the abovementioned advantages.

(13) A method for producing a reinforcing fiber molding, as described above, wherein the reinforcing fiber sheets are prepreg sheets containing the laminate maintaining material composed of an uncured thermosetting resin forming a matrix impregnated into the reinforcing fiber sheets; the strip-like laminate is formed of a laminate of the multiple prepreg sheets; and the produced reinforcing fiber molding is a prepreg to have the uncured thermosetting resin cured later, for producing a fiber-reinforced composite material.

This production method allows the production of a reinforcing fiber molding formed of prepreg sheets, namely, a prepreg, in addition to having the abovementioned advantages.

(14) An apparatus for producing a reinforcing fiber molding obtained by molding a strip-like laminate comprising layered multiple reinforcing fiber sheets and a laminate maintaining material for maintaining the layered state, which molding has at least two bent portions in the sectional form perpendicular to the longitudinal direction of the strip-like laminate, has a web portion formed between the ends of the adjacent bent portions, and has at least two flange portions protruding from the web portion via the bent portions, comprising:

(a) a supplying device for supplying the strip-like laminate, (b) a bent portion producing device for producing the at least two bent portions, and (c) a carrying device for intermittently carrying the strip-like laminate located continuously in the region from the supplying device to the bent portion producing device, wherein (d) the bent portion producing device comprises respectively independent at least two bent portion molding devices provided at different positions in the direction for carrying the strip-like laminate, (e) the at least two bent portion molding devices include a first bent portion molding device positioned on the upstream side and a second bent portion molding device positioned downstream of the first bent portion molding device, (f) the first bent portion molding device and the second bent portion molding device are arranged to ensure that the first bent portion molding device molds at least one bent portion of the at least two bent portions, and that the second bent portion molding device molds at least one bent portion of the at least two bent portions other than the bent portion molded by the first bent portion molding device, (g) the first bent portion molding device has a first mold comprising two mold parts facing each other and capable of being opened and closed for holding and pressurizing the strip-like laminate, to mold a bent portion, a first opening/closing means for opening and closing the first mold, and a first heating means for heating the first mold, (h) the second bent portion molding device has a second mold comprising two mold parts facing each other and capable of being opened and closed for holding and pressurizing the strip-like laminate, to mold a bent portion, a second opening/closing means for opening and closing the second mold, and a second heating means for heating the second mold, and (i) a mold opening/closing control means is provided for controlling the opening/closing of the first mold by the first opening/closing means and the opening/closing of the second mold by the second opening/closing means, to allow the intermittent carrying of the strip-like laminate by the carrying device.

(15) An apparatus for producing a reinforcing fiber molding, as described above, wherein a mold position changing means for changing the relative distance between the first mold and the second mold in the direction perpendicular to the carrying direction of the strip-like laminate is provided for each or either of the first mold and the second mold.

(16) An apparatus for producing a reinforcing fiber molding obtained by molding a strip-like laminate comprising layered multiple reinforcing fiber sheets and a laminate maintaining material for maintaining the layered state, which molding has at least two bent portions in the sectional form perpendicular to the longitudinal direction of the strip-like laminate, has a web portion formed between the ends of the adjacent bent portions, and has at least two flange portions protruding from the web portion via the bent portions, comprising:

(a) a supplying device for supplying the strip-like laminate, (b) a bent portion producing device for producing the at least two bent portions, and (c) a carrying device for intermittently carrying the strip-like laminate located continuously in the region from the supplying device to the bent portion producing device, wherein (d) the bent portion producing device comprises respectively independent at least two bent portion molding devices provided at the same position in the direction for carrying the strip-like laminate, (e) the at least two bent portion molding devices include a first bent portion molding device positioned on one end side in the width direction of the strip-like laminate and a second bent portion molding device positioned on the other end side in the width direction of the strip-like laminate, (f) the first bent portion molding device and the second bent portion molding device are arranged to ensure that the first bent portion molding device molds at least one bent portion of the at least two bent portions, and that the second bent portion molding device molds at least one bent portion of the at least two bent portions other than the bent portion molded by the first bent portion molding device, (g) the first bent portion molding device has a first mold comprising two mold parts facing each other and capable of being opened and closed for holding and pressurizing the strip-like laminate, to mold a bent portion, a first opening/closing means for opening and closing the first mold, and a first heating means for heating the first mold, (h) the second bent portion molding device has a second mold comprising two mold parts facing each other and capable of being opened and closed for holding and pressurizing the strip-like laminate, to mold a bent portion, a second opening/closing means for opening and closing the second mold, and a second heating means for heating the second mold, (i) a mold opening/closing control means is provided for controlling the opening/closing of the first mold by the first opening/closing means and the opening/closing of the second mold by the second opening/closing means, to allow the intermittent carrying of the strip-like laminate by the carrying device, and (j) a mold position changing means for changing the relative distance between the first mold and the second mold in the direction perpendicular to the carrying direction of the strip-like laminate is provided for each or either of the first mold and the second mold.

(17) An apparatus for producing a reinforcing fiber molding, as described above, wherein the relative distance is changed by the mold position changing means, to form a taper having an angle of θ.

(18) An apparatus for producing a reinforcing fiber molding, as described above, wherein a web heating and pressurizing device for heating and pressurizing such a region of the strip-like laminate, as destined to be the web portion later, is provided upstream of the first bent portion molding device.

According to one aspect of the method or apparatus for producing a reinforcing fiber molding according to an exemplary embodiment of the invention, different bent portions of a strip-like laminate formed of layered multiple reinforcing fiber sheets are molded in the strip-like laminate one after another by two molding steps (devices) respectively independently arranged in the molding steps for molding mutually different bent portions. Therefore, in the case where multiple reinforcing fiber moldings different in the distance between the bent portions are produced in the same process, it is not necessary to change the molds for respectively different moldings. Further, a reinforcing fiber molding in which the width of the web portion (the distance between the adjacent bent portions), that is, the gauge changes in the longitudinal direction can be produced in a short time at low cost. If the relative position of a pair of molds is changed, reinforcing fiber moldings of various shapes can be produced.

REFERENCE SIGNS LIST

Figure 1:
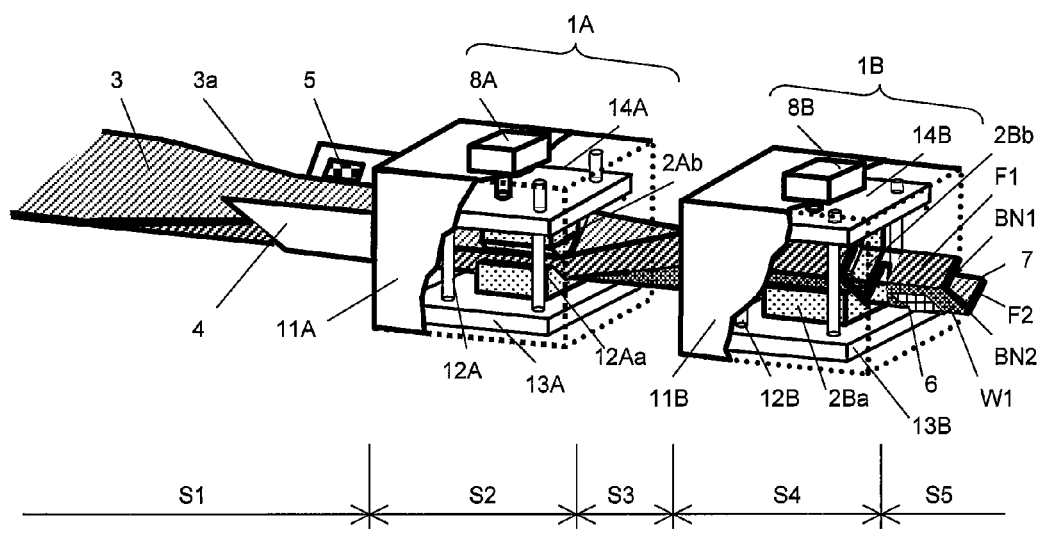
FIG. 1 is a perspective view showing the major components in an embodiment of the reinforcing fiber molding producing apparatus of the invention.

1A: first bent portion molding device
1B: second bent portion molding device
2A: first mold
2B: second mold
2Aa: lower mold part
2Ab: upper mold part
2Ba: lower mold part
2Bb: upper mold part
3: strip-like laminate
4: introducing guide
5: positioning guide
6: discharge guide
6A: first bent portion molding device
106B: second bent portion molding device
6BN1: first bent portion
6BN2: second bent portion
7: reinforcing fiber molding
8AOC: first opening/closing means (actuator)
8BOC: second opening/closing means (actuator)
9BN1a: bent portion
9BN1b: bent portion
9F1: flange portion
9F2: flange portion
9W1a: web portion
21: inter-bent-portion distance changing means
30: first bent portion ridgeline
31: second bent portion ridgeline
37a, 37b: corner filler
40: non-bent portion press device (web heating and pressurizing means)
41a, 41b: mold part
43: separation guide
50: filler molding device
60: first bent portion molding device
61a, 61b: central mold part
62: lateral mold part
62A: first mold
62B: second mold
62Aa: lower mold part
62Ab: upper mold part
62Ba: lower mold part
62Bb: upper mold part
68AOC: mold opening/closing actuator
68BOC: mold opening/closing actuator
70: second bent portion molding device
71a, 71b: central mold part
72: lateral mold part
80: hauling device (carrying device)
100: second bent portion molding device
101a: upper mold part
101b: lower mold part
103: actuator
201A: first mold
201B: second mold
211A: first bent portion molding device
211B: second bent portion molding device
212Aa: lower mold part
212Ab: upper mold part
212AY: lateral mold part
212Ba: lower mold part
212Bb: upper mold part
212BY: lateral mold part
218A: actuator
218AY: actuator
218B: actuator
218BY: actuator
BN1: bent portion
BN2: bent portion
F1: flange portion F2: flange portion
S1: supplying step
S2: first bent portion molding step
S3: supplying step
S4: second bent portion molding step
S5: carrying step
W1: web portion

DETAILED DESCRIPTION

Embodiments of the invention are explained below in reference to the drawings.

FIG. 1 schematically shows process and apparatus for producing a reinforcing fiber molding in accordance with an embodiment of the invention. In FIG. 1, a process for producing a reinforcing fiber molding 7 of the invention comprises a supplying step S1 for supplying a strip-like laminate 3, a bent portion producing step for producing at least two bent portions in the strip-like laminate 3 supplied from the supplying step S1, and a carrying step S5 for intermittently carrying the strip-like laminate 3 located continuously in the region from the supplying step S1 to the bend portion producing step.

The bent portion producing step comprises respectively independent at least two bent portion molding steps provided at different positions in the direction for carrying the strip-like laminate 3. The at least two bent portion molding steps include a first bent portion molding step S2 positioned on the upstream side and a second bent portion molding step S4 positioned downstream of the first bent portion molding step.

The first bent portion molding step S2 molds at least one bent portion BN1 of the at least two bent portions, and the second bent portion molding step S4 molds at least one bent portion BN2 of the at least two bent portions other than the bent portion molded by the first bent portion molding step S2.

Between the first bent portion molding step S2 and the second bent portion molding step S4, as required, a supplying step S3 is provided for positively supplying the strip-like laminate 3 processed by the first bent portion molding step S2 to the second bent portion molding step S4.

This embodiment shows a case where a reinforcing fiber molding 7 having two bent portions BN1 and BN2 is produced. Therefore, the bent portion producing step has the first bent portion molding step S2 and the second bent portion molding step S4, namely, two bent portion molding steps in total. The first bent portion molding step S2 molds the bent portion BN1, and subsequently, the second bent portion molding step S4 positioned downstream of the first bent portion molding step S2 molds the bent portion BN2 different from the bent portion BN1.

In the case where the employed mode is such that if the strip-like laminate 3 can be supplied from the supplying step S1 to the first bent portion molding step S2 when the produced reinforcing fiber molding 7 is intermittently moved by the carrying step S5, a means for positively supplying the strip-like laminate 3 in the supplying step S1 is not necessary. However, as required, a means for positively supplying the strip-like laminate 3 from the supplying step S1 to the first bent portion molding step can be installed. As the supplying means in this case, for example, a generally known means for supplying or carrying a strip-like object such as rotating rolls, rotating nip rolls or belt conveyor can be used.

An introducing guide 4 for guiding the strip-like laminate 3 is installed in the region from the end of the supplying step S1 to the beginning of the first bent portion molding step S2. In this embodiment, the introducing guide 4 is formed of a metallic plate V-shaped in cross section. The initially flat strip-like laminate 3 is bent in V shape by the introducing guide 4, and guided on the upper surface of the introducing guide 4, being supplied into the first bent portion molding step S2. A positioning guide 5 is attached to a part of a surface of the introducing guide 4. The positioning guide 5 guides the edge 3a of the strip-like laminate 3. The introducing guide 4 and the positioning guide 5 stabilize the movement of the strip-like laminate 3 into the first bent portion molding step.

Figure 2:
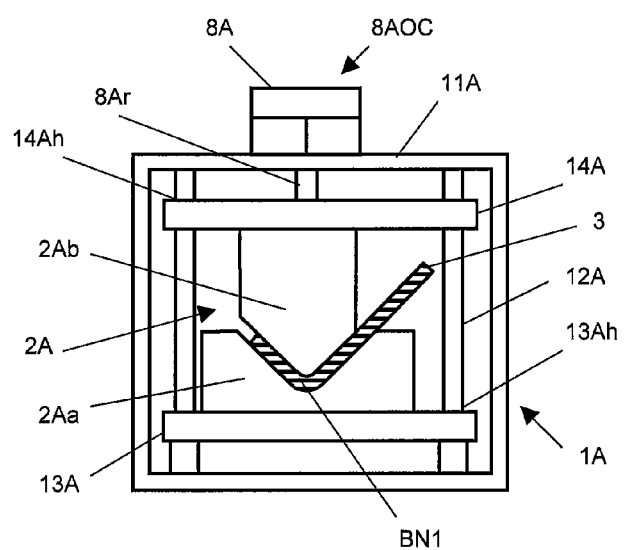
FIG. 2 is a cross sectional view showing an embodiment of the first bent portion molding device of FIG. 1.

In the first bent portion molding step S2, a first bent portion molding device 1A is installed. FIG. 2 is a cross sectional view of the first bent portion molding device 1A. In FIG. 2, the first bent portion molding device 1A comprises a box-shaped base 11A having an inlet and an outlet of the strip-like laminate 3. The box-shaped base 11A is fixed on the machine base in the production process.

Inside the box-shaped base 11A, vertical mold guide bars 12A are fixed at the four corners to the inner bottom surface and to the inner top surface of the box-shaped base 11A. Further, inside the box-shaped base 11A, a lower mold part guide plate 13A having holes 13Ah formed therein at the four corners to allow the passing of the mold guide bars 12A and an upper mold part guide plate 14A having holes 14Ah formed therein also at the four corners to allow the passing of the mold guide bars 12A are supported by the mold guide bars 12A.

Furthermore, inside the box-shaped base 11A, a first mold 2A comprising a lower mold part 2Aa and an upper mold part 2Ab facing each other and capable of being opened and closed is installed for holding and pressurizing the strip-like laminate 3, to mold a bent portion BN1. In this embodiment, the lower mold part 2Aa has a recess and the upper mold part 2Ab has a projection corresponding to the recess. The lower mold part 2Aa is fixed to the lower mold part guide plate 13A, and the upper mold part 2Ab is fixed to the upper mold part guide plate 14A.

It is preferred that the lower mold part 2Aa and/or the upper mold part 2Ab is provided with a heating means having a temperature control function to heat the mold part for enhancing the processability of the strip-like laminate 3. A mold part can be heated by supplying and circulating hot water in the mold part or using an electric heater, oil heater, etc. attached to the mold part. In the case where the mold part is heated, since the strip-like laminate 3 is heated during molding, the molding cycle can be completed earlier.

The lower mold part guide plate 13A is fixed to the mold guide bars 12A. On the other hand, the upper mold part guide plate 14A can be moved vertically along the mold guide bars 12A. On the outer top surface of the box-shaped base 11A, a cylinder 8A is provided. The cylinder 8A can be an air or hydraulic cylinder. From the cylinder 8A, a piston rod 8Ar connected with the inside piston extends outward. The tip of the piston rod 8Ar is connected with the upper mold part guide plate 14A. The cylinder 8A constitutes a first opening/closing means (actuator) 8AOC for opening and closing the clearance between the lower mold part 2Aa and the upper mold part 2Ab positioned to face each other with the clearance kept between them.

Figure 3:
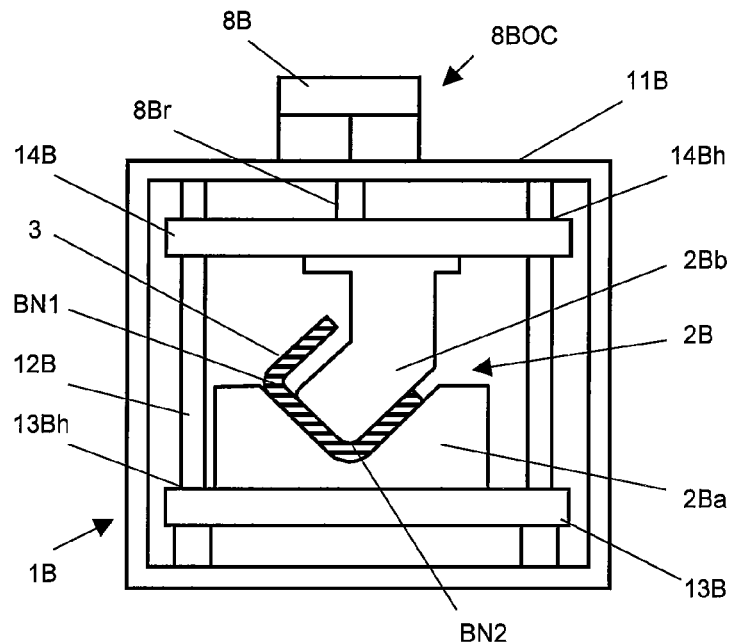
FIG. 3 is a cross sectional view showing an embodiment of the second bent portion molding device of FIG. 1.

In the second bent portion molding step S4, a second bent portion molding device 1B is installed. FIG. 3 is a cross sectional view showing the second bent portion molding device 1B. In FIG. 3, the second bent portion molding device 1B comprises a box-shaped base 11B having an inlet and an outlet for the strip-like laminate 3. The box-shaped base 11B is fixed on the machine base in the production process.

Inside the box-shaped base 11B, vertical mold guide bars 12B are fixed at the four corners to the inner bottom surface and to the inner top surface of the box-shaped base 11B. Further, inside the box-shaped base 11B, a lower mold part guide plate 13B having holes 13Bh formed therein at the four corners to allow the passing of the mold guide bars 12B and an upper mold part guide plate 14B having holes 14Bh formed therein also at the four corners is to allow the passing of the mold guide bars 12B are supported by the mold guide bars 12B.

Furthermore, inside the box-shaped base 11B, a second mold 2B comprising a lower mold part 2Ba and an upper mold part 2Bb facing each other and capable of being opened and closed is installed for holding and pressurizing the strip-like laminate 3, to mold a bent portion BN2. In this embodiment, the lower mold part 2Ba has a recess and the upper mold part 2Bb has a projection corresponding to the recess. The lower mold part 2Ba is fixed to the lower mold part guide plate 13B, and the upper mold part 2Bb is fixed to the upper mold part guide plate 14B.

It is preferred that the lower mold member 2Ba and/or the upper mold part 2Bb is provided with a heating means having a temperature control function to heat the mold part for enhancing the processability of the strip-like laminate 3. A mold part can be heated by supplying and circulating hot water in the mold part or using an electric heater, oil heater, etc. attached to the mold part. In the case where the mold part is heated, since the strip-like laminate 3 is heated during molding, the molding cycle can be completed earlier.

The cross sectional form of the lower mold part 2Ba of the second bent portion molding device 1B is the same as the cross sectional form of the lower mold part 2Aa of the first bent portion molding device 1A. However, the cross sectional form of the upper mold part 2Bb of the second bent portion molding device 1B is different from the cross sectional form of the upper mold part 2Ab of the first bent portion molding device 1A. The reason is that when the strip-like laminate 3 having the bent portion BN1 and the successive flange portion F1 formed by the first bent portion molding device 1A is supplied to the second bent portion molding device 1B, it is necessary to prevent the contact between the flange portion F1 and the upper mold part 2Bb.

The lower mold part guide plate 13B is fixed to the mold guide bars 12B. On the other hand, the upper mold part guide plate 14B can be moved vertically along the mold guide bars 12B. On the outer top surface of the box-shaped base 11B, a cylinder 8B is attached. The cylinder 8B can be an air or hydraulic cylinder. From the cylinder 8B, a piston rod 8Br connected with the inside piston extends outward. The tip of the piston rod 8Br is connected with the upper guide plate 14B. The cylinder 8B constitutes a second opening/closing means (actuator) 8BOC for opening and closing the clearance between the lower mold part 2Ba and the upper mold part 2Bb positioned to face each other with the clearance kept between them.

Between the first bent portion molding device 1A and the second bent portion molding device 1B, that is, in the supply step S3, it is preferred to install a guide plate similar to the introducing guide 4 for guiding the strip-like laminate 3, so that the strip-like laminate 3 can be carried into the second bent portion molding device 1B in such a manner as to prevent the deformation of the molded first bent portion BN1.

In the carrying step S5, a discharge guide 6 and a carrying device for hauling the produced reinforcing fiber molding 7 from the second bent portion molding step S4 (the second bent portion molding device 1B) are installed. The discharge guide 6 is a guide for discharging the reinforcing fiber molding 7 from the second bent portion molding device 1B in such a manner as to prevent the deformation of the bent portions BN1 and BN2 molded in the reinforcing fiber molding 7.

Meanwhile, in FIG. 1, the carrying device is not depicted. The carrying device is only required to be a device that can hold and move the produced reinforcing fiber molding in the direction of hauling from the second bent portion molding device 1B. For example, usable is a known mold holding and carrying device that can hold the flange portion F1 and/or the flange portion F2 of the reinforcing fiber molding and carry the held reinforcing fiber molding in the longitudinal direction. The reinforcing fiber molding can also be held on both the inside and outside of the web portion W1.

The carrying of the reinforcing fiber molding in the carrying step S5 is performed intermittently in response to the lengths of the formed bent portions in the longitudinal direction after the molding of the bent portions by the first bent portion molding step (first mold 2A) and the second bent portion molding step (second mold 2B) has been completed.

There is a mold opening/closing control means for controlling the action timing among the carrying device of the reinforcing fiber molding 7, the first opening/closing means 8AOC and the second opening/closing means 8BOC. In FIG. 1, they are not depicted. A known control means for controlling the start actions, end actions and operation procedures of multiple devices can be used as a mold opening/closing means.

In FIG. 1, the strip-like laminate 3 is passed through the introducing guide 4, the positioning guide 5, the first mold 2A in its opened state, the second mold 2B in its opened state and the discharge guide 6, to establish the initial state for molding.

In this state, the upper mold part 2Ab of the first mold 2A is pressed against the lower mold part 2Aa via the strip-like laminate 3 by the action of the cylinder 8A. Along the edge of the strip-like laminate 3 on one side, the first bent portion BN1 is molded by the upper mold part 2Ab and the lower mold part 2Aa. When the first bent portion BN1 is molded, the flange portion F1 and the web portion W1 are also formed.

Then the first mold 2A is opened, and the portion of the strip-like laminate 3 positioned in the portion of the discharge guide 6 in the initial state is carried by the carrying device, to move the region having the first bent portion BN1 molded to the second mold 2B in its opened state.

In this state, the upper mold part 2Bb of the second mold 2B is pressed against the lower mold part 2Ba by the action of the cylinder 8B via the region destined to be the second bent portion BN2 of the strip-like laminate 3 having the first bent portion BN1 and the flange portion F1 formed. Along the edge of the strip-like laminate 3 on the other side, the second bent portion BN2 is molded by the upper mold part 2Bb and the lower mold part 2Ba. When the second bent portion BN2 is molded, the flange portion F2 and the web portion W1 are also formed. In this embodiment, the strip-like laminate 3 is twisted in the width direction during the transfer from the first bent portion molding device 1A and the second bent portion molding device 1B due to the positional relation between the first mold 2A and the second mold 2B.

Next, the first mold 2A and the second mold 2B are opened, and the portion of the strip-like laminate 3 positioned in the portion of the discharge guide 6 in the initial state is carried by the carrying device, to carry the reinforcing fiber molding 7 with the flange portion F1, the first bent portion BN1, the web portion W1, the second bent portion BN2 and the flange portion F2 formed, to the portion of the discharge guide 6.

In the bent portions, the web portion and the flange portions formed by the first mold 2A and the second mold 2B, the multiple reinforcing fiber sheets forming the strip-like laminate 3 are bonded to each other by the resin used as the laminate maintaining material existing in and between the multiple reinforcing fiber sheets. With this bonding, the voids in the laminate are decreased to raise the fiber volume content, and the shape of the strip-like laminate 3 or the reinforcing fiber molding is retained or is likely to be retained.

Figure 4:
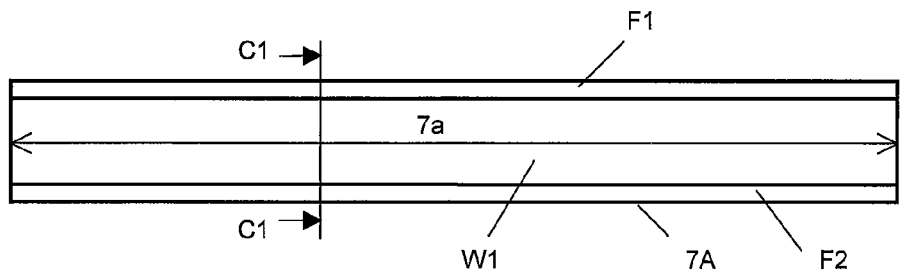
FIG. 4 is a plan view showing an example of the reinforcing fiber molding produced by the production apparatus of FIG. 1.
Figure 5:
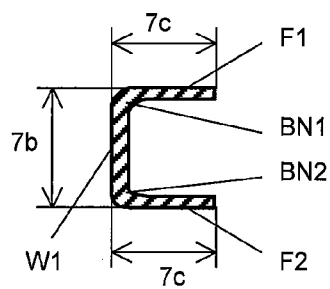
FIG. 5 is a C1-C1 sectional view of FIG. 4.

The above molding steps are intermittently repeated to produce the reinforcing fiber molding 7A with the predetermined length and cross sectional form shown in FIGS. 4 and 5. The reinforcing fiber molding 7A shown in FIGS. 4 and 5 is a reinforcing fiber molding C-shaped in cross sectional form having the bent portions BN1 and BN2 and has the web portion W1 having a length 7a and an outer width 7b and flange portions F1 and F2 respectively having an outer height 7c.

This embodiment employs a mode wherein the strip-like laminate or the reinforcing fiber molding is moved relatively to the molds, but in the case where a reinforcing fiber molding not so long is produced, a mode wherein the molds are moved in the longitudinal direction without moving the strip-like laminate or the reinforcing fiber molding can be employed.

Figure 6:
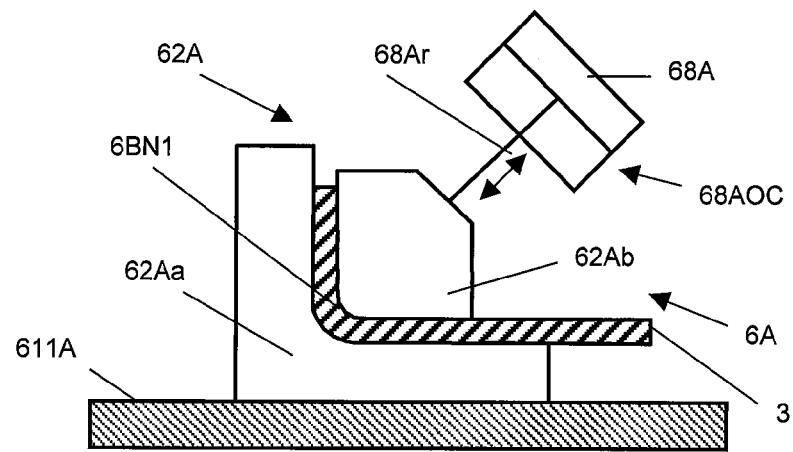
FIG. 6 is a cross sectional view showing another embodiment of the first bent portion molding device of the production apparatus of FIG. 1.
Figure 7:
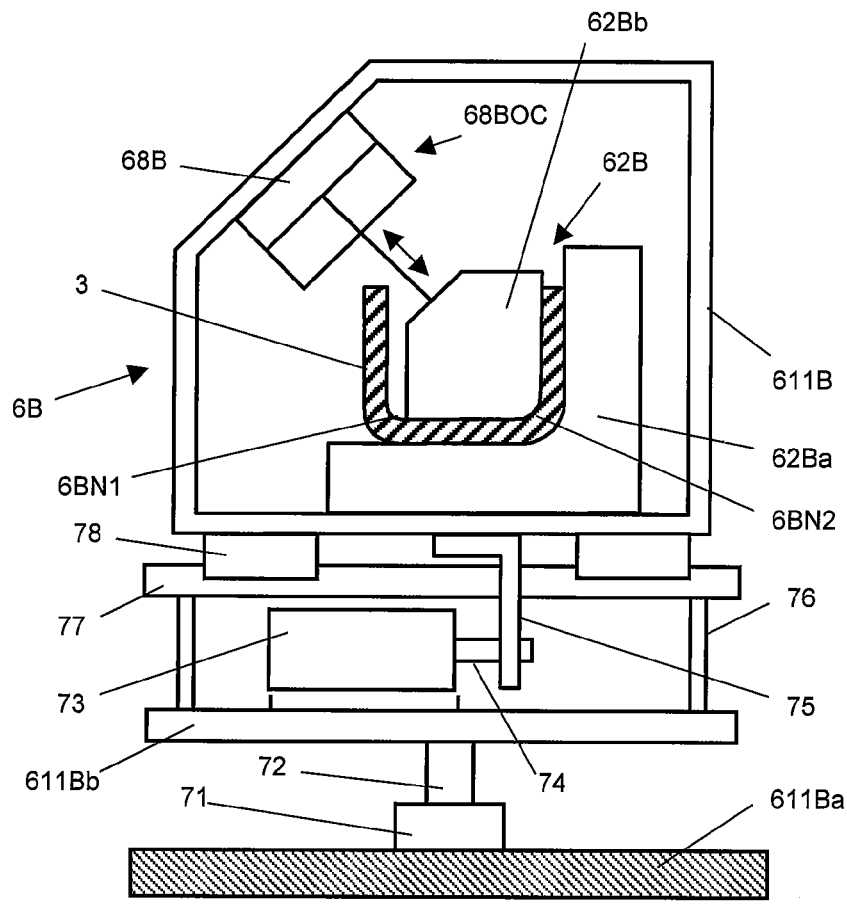
FIG. 7 is a cross sectional view showing another embodiment of the second bent portion molding device of the production apparatus of FIG. 1.

FIG. 6 shows a first bent portion molding device 6A as an embodiment different from that of the first bent portion molding device 1A shown in FIG. 2. FIG. 7 shows a second bent portion molding device 6B as an embodiment different from that of the second bent portion molding device 1B shown in FIG. 3. These bent portion molding devices are developed to avoid that the strip-like laminate 3 is twisted during the transfer from the first bent portion molding device 1A and the second bent portion molding device 1B in the process for producing the reinforcing fiber molding 7 shown in FIG. 1.

In FIG. 6, the first bent portion molding device 6A has a first mold 62A installed on a base 611A. The first mold 62A has a lower mold part 62Aa and an upper mold part 62Ab. The first bent portion molding device 6A has a mold opening/closing actuator 68AOC supported by the base 611A. The upper mold part 62Ab is opened from and closed to the lower mold part 62Aa by the mold opening/closing actuator 68AOC. In the state where the upper mold part 62Ab and the lower mold part 62Aa are closed, the strip-like laminate 3 positioned between these mold parts is pressurized to mold the first bent portion 6BN1.

In FIG. 7, the second bent portion molding device 6B has a second mold 62B installed on a base 611B. The second mold 62B has a lower mold part 62Ba and an upper mold part 62Bb. The second bent portion molding device 6B has a mold opening/closing actuator 68BOC supported by the base 611B. The upper mold part 62Bb is opened from and closed to the lower mold part 62Ba by the mold opening/closing actuator 68BOC. In the state where the upper mold part 62Bb and the lower mold part 62Ba are closed, the strip-like laminate 3 positioned between these mold parts is pressurized to mold the second bent portion 6BN2.

The second bent portion molding device 6B has a mold horizontally moving mechanism for moving the base 611B in the horizontal direction perpendicular to the longitudinal direction of the strip-like laminate 3 and a mold rotating mechanism for rotating the base 611B with the axis in the vertical direction perpendicular to the longitudinal direction of the strip-like laminate 3 as the rotating axis.

The mold rotating mechanism comprises a motor 71 installed on a base 611Ba, a rotating shaft 72 extending from the motor 71 and a base 611Bb installed at the top end of the rotating shaft 72. The mold horizontal moving mechanism comprises an air or hydraulic cylinder 73 installed on the base 611Bb, a piston rod 74 extended from the piston of the cylinder 73, a connecting member 75 connected, at its one end, with the tip of the piston rod 74 and connected, at its other end, with the bottom surface of the base 611B, two guide rails 77 supported by four poles 76, and four guide shoes 78 attached to the bottom surface of the base 611B and capable of moving along the guide rails 77.

The mold horizontal moving mechanism and the mold rotating mechanism of the second bent portion molding device 6B provide an inter-bent-portion distance changing step in the reinforcing fiber molding producing method according to one aspect of the invention and also provides a mold position changing means in the reinforcing fiber molding producing apparatus according to one aspect of the invention.

If the mold horizontally moving mechanism and the mold rotating mechanism of the second bent portion molding device 6B are used, a reinforcing fiber molding in which the distance between the bent portions, the height (width) of the web portion or the distance (height) between the flange portions respectively explained later changes in the longitudinal direction on one side in the width direction can be produced.

The first bent portion molding device 6A may also be provided with the same mold horizontally moving mechanism and mold rotating mechanism as those of the second bent portion molding device 6B. In this case, a reinforcing fiber molding in which the distance between the bent portions explained later changes in the longitudinal direction on both sides in the width direction can be produced.

Figure 8:
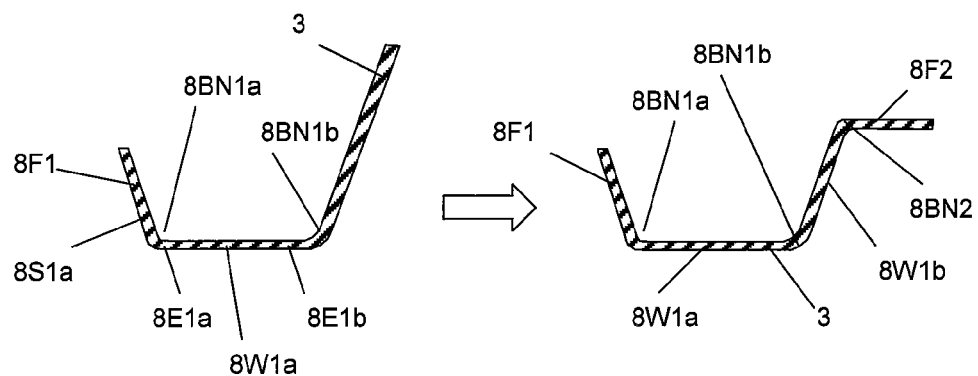
FIG. 8 is a cross sectional view for explaining the order of molding the first bent portion and the second bent portion in an example of the reinforcing fiber molding produced according to the invention.

FIG. 8 is a drawing for explaining an example of how to mold the bent portions in the case where the first bent portion and the second bent portion are molded according to one aspect of the invention. In FIG. 8, the drawing on the left side shows a state where two bent portions 8BN1a and 8BN1b are molded by the first bent portion molding step. In this state, a web portion 8W1a is formed between the ends of the two bent portions, with the right side end of the bent portion 8BN1a as one end point 8E1a and with the left side end of the bent portion 8BN1b as the other end point 8E1b, and a flange portion 8F1 extending with the left side end of the bent portion 8BN1a as the starting end 8S1a is formed.

In the strip-like laminate 3 shown in the right drawing of FIG. 8, a bent portion 8BN2 different from the bent portions 8BN1a and 8BN1b is molded by the second bent portion molding step. In this state, a web portion 8W1b is formed between the bent portion 8BN1b and the bent portion 8BN2, and further a flange portion 8F2 extending from the bent portion 8BN2 is formed.

Figure 9:
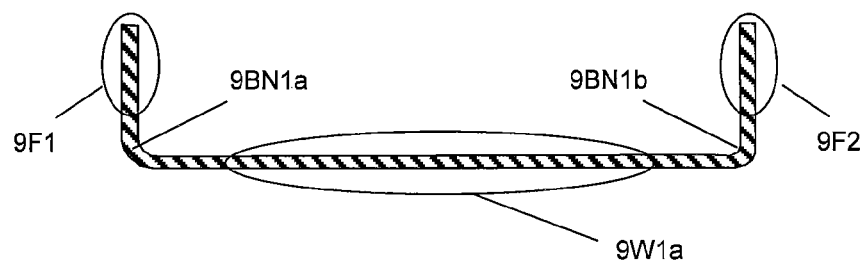
FIG. 9 is a cross sectional view for explaining the web portion and the flange portions in an example of the reinforcing fiber molding of the invention.

FIG. 9 shows an example of the reinforcing fiber molding having a web portion 9W1a, bent portions 9BN1a and 9BN1b on both sides thereof, a flange portion 9F1 extending from the bent portion 9BN1a and a flange portion 9F2 extending from the bent portion 9BN1b. This is a case where the width of the web portion 9W1a between the two bent portions 9BN1a and 9BN1b is large. In the molding steps of the reinforcing fiber molding, the bent portion 9BN1a and the flange portion 9F1 are pressurized and heated by the first mold during molding. Further, the bent portion 9BN1b and the flange portion 9F2 are pressurized and heated by the second mold during molding. However in the case where the width of the web portion 9W1a is large, the central portion of the web portion 9W1a is not pressurized or heated by the molds.

Figure 10:
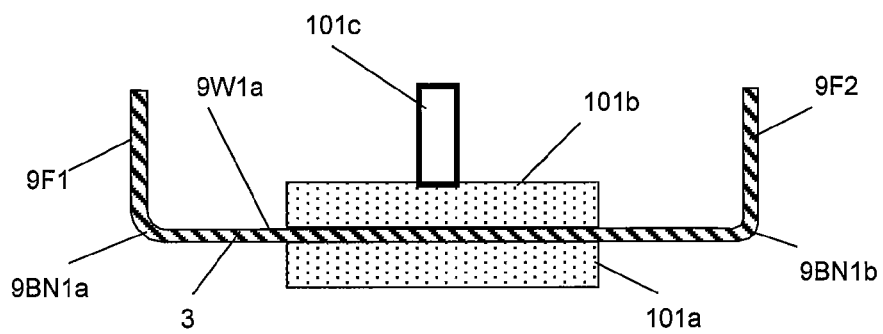
FIG. 10 is a cross sectional view showing an example of the web heating and pressurizing means used as used in the production of the reinforcing fiber molding of an embodiment of the invention.

In this case, it is preferred to install a web heating and pressurizing means. A schematic cross sectional view of an example of the web heating and pressurizing means is shown in FIG. 10. In FIG. 10, the web heating and pressurizing means comprises a lower mold part 101a positioned below the central portion of the wide web portion 9W1a and an upper mold part 101b positioned above. The upper mold part 101*b* is connected with an actuator 101*c* for pressurization. The mold can be heated as in the case where the abovementioned molds are heated.

Figure 11:
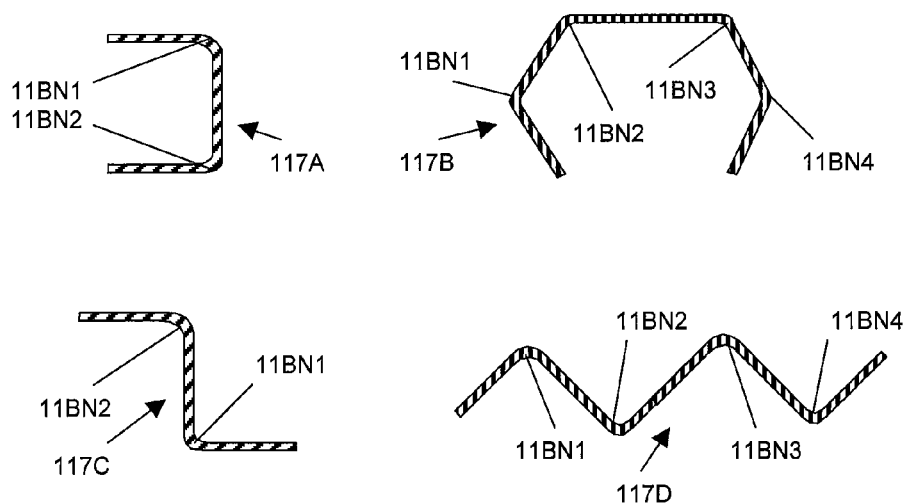
FIG. 11 shows four cross sectional views each of which is an example of the reinforcing fiber molding produced according to an embodiment of the invention.

In FIG. 11, cross sectional views of four typical examples of the reinforcing fiber molding produced by the invention are shown. In FIG. 11, a reinforcing fiber molding 117A has two bent portions 11BN1 and 11BN2. The reinforcing fiber molding 117A has the same sectional form as that of the reinforcing fiber molding 7A shown in FIGS. 4 and 5. The molding is referred to as C-shaped (or U-shaped, as the case may be) molding.

The reinforcing fiber molding 117B has four bent portions 11BN1, 11BN2, 11BN3 and 11BN4. The reinforcing fiber molding 117B has a hexagonal cross sectional form devoid of one side. The reinforcing fiber molding 117C has two bent portions 11BN1 and 11BN2. The reinforcing fiber molding 117C is referred to as Z-shaped molding. The reinforcing fiber molding 117D has four bent portions 11BN1, 11BN2, 11BN3 and 11BN4. The reinforcing fiber molding 117D has a wavy cross sectional form.

Figure 12:
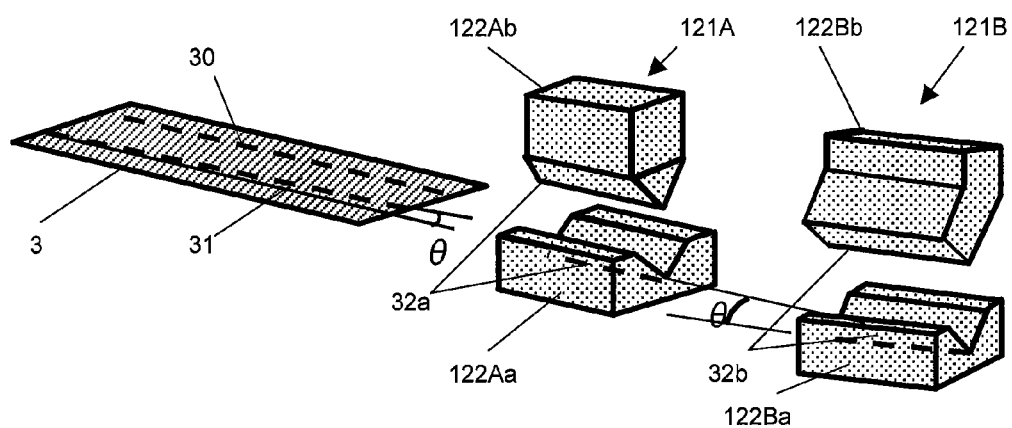
FIG. 12 is a schematic perspective view for explaining an example of the apparatus for producing a reinforcing fiber molding in which the width of the web portion changes like a taper in the longitudinal direction, according to an embodiment of the invention.

FIG. 12 is a schematic perspective view showing a modified embodiment of the reinforcing fiber molding producing method (apparatus) of the invention. A feature of the production method (production apparatus) shown in FIG. 12 is that the longitudinal direction of the first bent portion molded by the first bent portion molding step is different by angle θ from the longitudinal direction of the second bent portion molded by the second bent portion molding step.

In FIG. 12, the strip-like laminate 3 is supplied to the first bent portion molding device 121A. The first bent portion molding device 121A has a lower mold part 122Aa and an upper mold part 122Ab. The first bent portion molding device 121A is the same as the first bent portion molding device 1A shown in FIG. 2. The first bent portion is molded at the ridgeline 32*a* of the mold. The direction of the ridgeline 32*a* of the mold is parallel to the longitudinal direction of the strip-like laminate 3. The direction of the first bent portion molded at the ridgeline 32*a* of the mold is indicated by the first bent portion ridgeline 30 virtually drawn on the strip-like laminate 3.

The strip-like laminate 3 having the first bent portion molded is carried to the second bent portion molding device 121B. The second bent portion molding device 121B has a lower mold part 122Ba and an upper mold part 122Bb. The second bent portion molding device 121B is the same as the second bent portion molding device 1B shown in FIG. 3. The second bent portion is molded at the ridgeline 32*b* of the mold. The direction of the ridgeline 32*b* of the mold is inclined from the longitudinal direction of the strip-like laminate 3 by θ degrees. The direction of the second bent portion molded at the ridgeline 32*b* of the mold is indicated by the second bent portion ridgeline 31 virtually drawn on the strip-like laminate 3. Thus, the two bent portions different in direction from each other are molded in the strip-like laminate 3.

Figure 13:
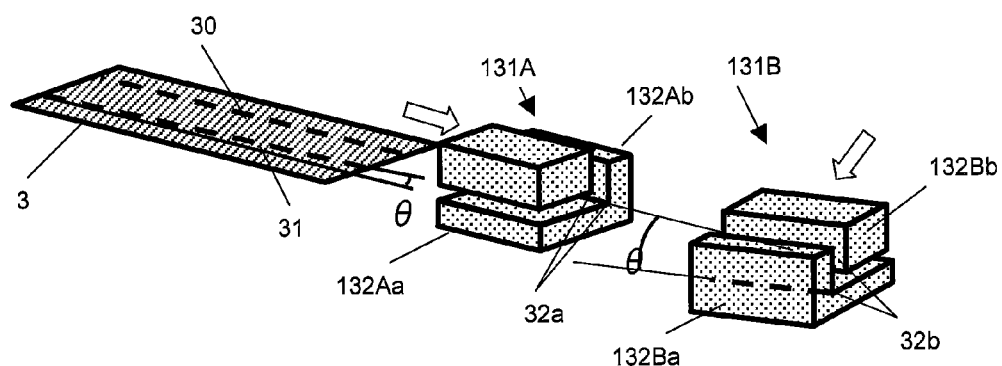
FIG. 13 is a schematic perspective view for explaining another example of the apparatus for producing a reinforcing fiber molding in which the width of the web portion changes like a taper in the longitudinal direction, according to an embodiment of the invention.

FIG. 13 is a schematic perspective view showing another modified embodiment of the reinforcing fiber molding producing method (apparatus) of the invention. A feature of the production method (production apparatus) shown in FIG. 13 is that the longitudinal direction of the first bent portion molded by the first bent portion molding step is different by angle θ from the longitudinal direction of the second bent portion molded by the second bent portion molding step.

In FIG. 13, the strip-like laminate 3 is supplied to the first bent portion molding device 131A. The first bent portion molding device 131A has a lower mold part 132Aa and an upper mold part 132Ab. The first bent portion molding device 131A is the same as the first bent portion molding device 6A shown in FIG. 6. The first bent portion is molded at the ridgeline 32*a* of the mold. The direction of the ridgeline 32*a* of the mold is parallel to the longitudinal direction of the strip-like laminate 3. The direction of the first bent portion molded at the ridgeline 32*a* of the mold is indicated by the first bent portion ridgeline 30 virtually drawn on the strip-like laminate 3.

The strip-like laminate 3 having the first bent portion molded is carried to the second bent portion molding device 131B. The second bent portion molding device 131B has a lower mold part 132Ba and an upper mold part 132Bb. The second bent portion molding device 131B is the same as the second bent portion molding device 6B shown in FIG. 7. The second bent portion is molded at the ridgeline 32*b* of the mold. The direction of the ridgeline 32*b* of the mold is inclined from the longitudinal direction of the strip-like laminate 3 by θ degrees. The direction of the second bent portion molded at the ridgeline 32*b* of the mold is indicated by the second bent portion ridgeline 31 virtually drawn on the strip-like laminate 3. Thus, the two bent portions different in direction from each other are formed in the strip-like laminate 3.

However, if the method of molding the two bent portions different in direction from each other explained above in reference to FIG. 12 or 13 is used as it is, the second bent portion ridgeline 31 cannot be a straight line in the produced reinforcing fiber molding. The mold position adjusting technique for connecting the otherwise discrete ridgeline segments respectively with inclination angle θ is explained below in reference to FIG. 14.

Figure 14:
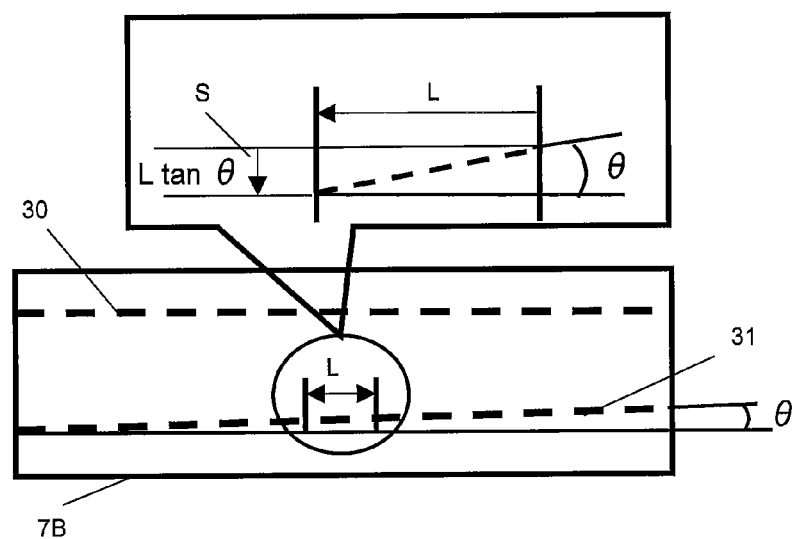
FIG. 14 is a partially expanded plan view for explaining the movement of a mold for forming a taper in the production apparatus shown in FIG. 12 or 13.

FIG. 14 is a development showing the produced reinforcing fiber molding 7B, presented together with a partially expanded view. The mold position adjusting operation for connecting the otherwise discrete bent portion segments molded one after another by intermittent conveyance is performed by moving the mold with an inclined ridgeline 32*b* shown in FIG. 12 or 13 in the direction perpendicular to the longitudinal direction of the strip-like laminate 3 whenever the strip-like laminate 3 is intermittently carried in the longitudinal direction by a certain distance.

In FIG. 14, whenever the strip-like laminate 3 is fed (carried) once in the longitudinal direction, the mold with an inclined ridgeline 32*b* shown in FIG. 12 or 13 is moved in the direction perpendicular to the longitudinal direction. This moving distance S is expressed by $S = L \times \tan\theta$, where L is the feed distance (carried distance) of the strip-like laminate 3 per time in the longitudinal direction and θ is the taper angle in reference to the longitudinal direction.

The mold position adjusting operation of the mold of the second bent portion molding device 131B shown in FIG. 13 can be performed, for example, by using the mold horizontally moving mechanism and the mold rotating mechanism of the second bent portion molding device 6B of FIG. 7. A reinforcing fiber molding having tapers in both the two bent portions can be produced by using the same device as the second bent portion molding device 6B of FIG. 7, as the first bent portion molding device 6A of FIG. 6.

Figure 15:
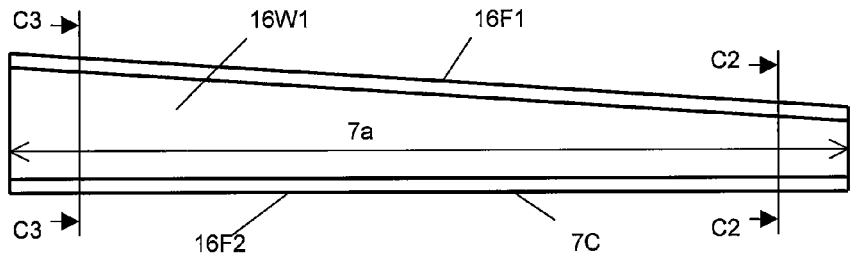
FIG. 15 is a plan view showing an example of the reinforcing fiber molding produced by the production apparatus shown in FIG. 12 or 13.

FIG. 15 is a plan view showing a reinforcing fiber molding 7C having a taper on one side, produced by the invention. In FIG. 15, the reinforcing fiber molding 7C has a web portion 16W1, a flange portion 16F1 formed along one edge of the web portion via a bent portion and a flange portion 16F2 formed along the other edge via another bent portion. The flange portion 16F1 is tapered in the longitudinal direction of the reinforcing fiber molding 7C.

Figure 16:
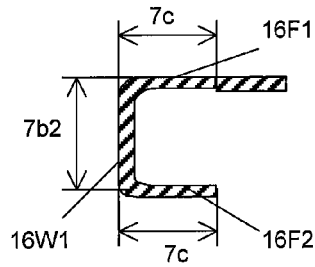
FIG. 16 is a C2-C2 sectional view of FIG. 15.
Figure 17:
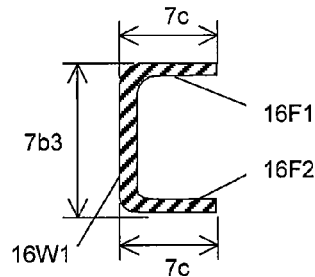
FIG. 17 is a C3-C3 sectional view of FIG. 15.
Figure 18:
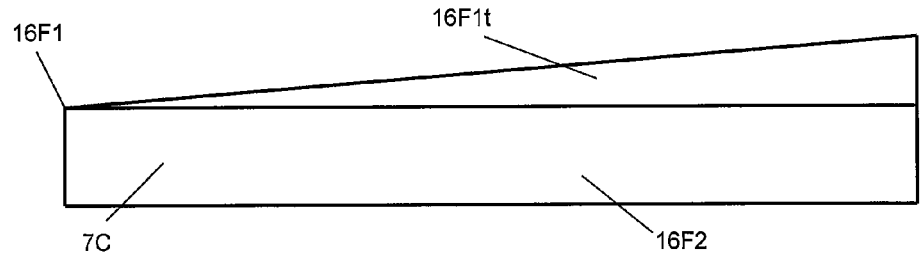
FIG. 18 is a side view showing an example of the reinforcing fiber molding as produced by the production apparatus shown in FIG. 12 or 13.

FIG. 16 is a C2-C2 sectional view of FIG. 15. FIG. 17 is a C3-C3 sectional view of FIG. 15. FIG. 18 is a side view of the reinforcing fiber molding 7C shown in FIG. 15. In the case where a reinforcing fiber molding with a taper is produced from a strip-like laminate with a constant width, the flange portion 16F1 of the reinforcing fiber molding 7C as produced is high at a position narrow in the width of the web portion 16W2 and is low at a position wide in the width of the web portion 16W2. A reinforcing fiber molding with left and right flange portions which are in the same height each other can be produced by trimming the triangular flange portion 16F1t shown in FIG. 18.

The above embodiments are cases where the first bent portion molding step and the second bent portion molding step are mainly arranged on the upstream side and the downstream side in the moving direction of the strip-like laminate. These embodiments are useful in the case where the width of the formed web portion is narrow and where the first mold for molding the first bent portion and/or the second mold for molding the second bent portion is large relatively to the width of the web portion, that is, in the case where it is difficult to arrange both the molds at the same position in the moving direction of the strip-like laminate, namely, it is difficult to arrange both the molds in parallel to each other in the width direction. The outline of these embodiments is shown in FIG. 19.

Figure 19:
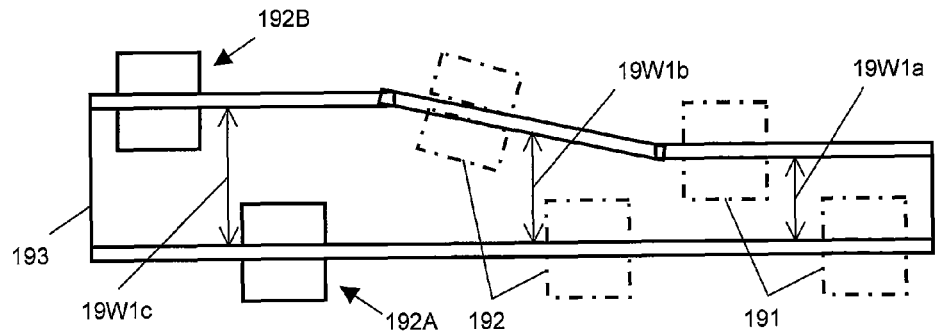
FIG. 19 is a plan view for explaining an example of the apparatus for producing a reinforcing fiber molding in which the width of the web portion changes twice in the longitudinal direction, according to an embodiment of the invention.

FIG. 19 is a plan view showing a process for producing a reinforcing fiber molding. FIG. 19 depicts a strip-like laminate 193 in its stationary state and shows the positional relations between the first mold 192A and the second mold 192B on one hand and present and past strip-like laminates 193 on the other hand. The actual molding of the bent portions is performed by the first mold 192A and the second mold 192B at the position of them shown by solid lines. The state where the web portion 19W1a in the portion with a narrow width is formed by the first mold 192A and the second mold 192B at this position is shown by virtual lines 191, and the state where the web portion 19W1b in a tapered portion is formed by the first mold 192A and the second mold 192B is shown by virtual lines 192. FIG. 19 is useful for understanding the state where the second mold 192B is moved upward at the position shown with solid lines as the reinforcing fiber molding is progressively produced. Further, from the sizes of the first mold 192A and the second mold 192B depicted with virtual lines 191, it can be understood that the molds cannot be installed in parallel to each other in the width direction.

Figure 20:
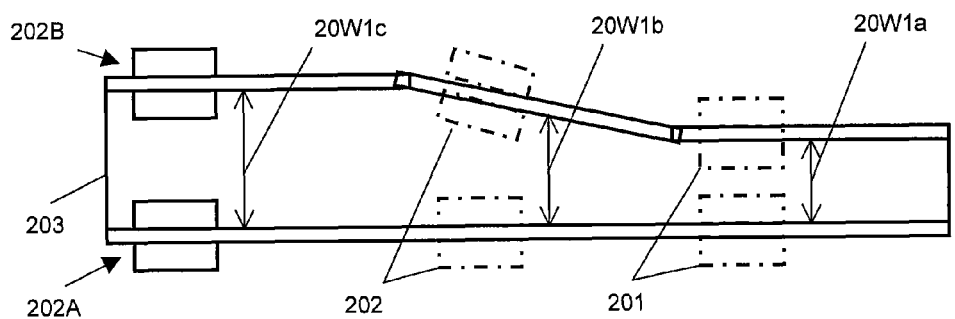
FIG. 20 is a plan view for explaining another example of the apparatus for producing a reinforcing fiber molding in which the width of the web portion changes twice in the longitudinal direction, according to an embodiment of the invention.

On the contrary, FIG. 20 shows a case where the first mold 202A and the second mold 202B can be installed in parallel to each other in the direction perpendicular to the longitudinal direction of the strip-like laminate 203 even in the web portion 20W1a with a narrow width, by the same depiction method. The first molds 202A and the second molds 202B depicted with virtual lines 201 and 202 are depicted for the same explanation as in the case of FIG. 19.

Figure 21:
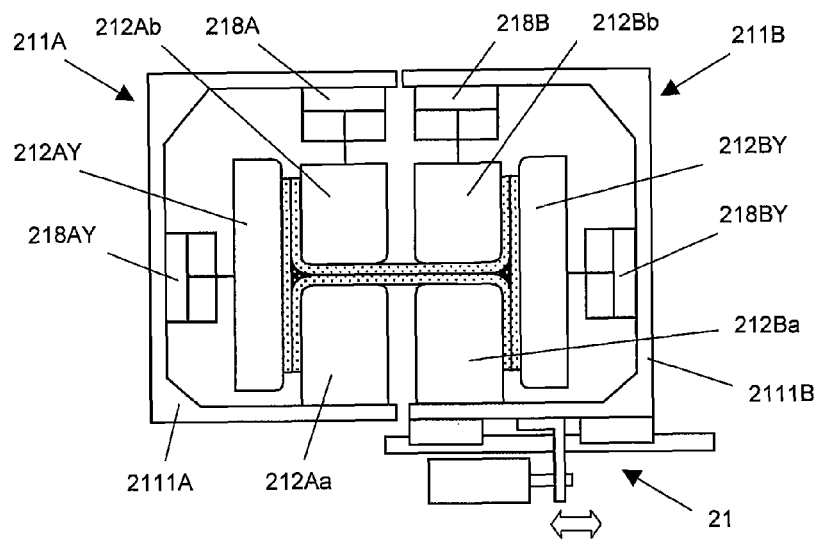
FIG. 21 is a cross sectional view showing an example of the second bent portion molding device used in the apparatus of FIG. 19 or 20.

FIG. 21 is a cross sectional view showing an example of the bent portion molding devices where the first mold 202A and the second mold 202B installed in parallel to each other in the width direction for molding the respectively independent different bent portions in FIG. 20, are installed in parallel to each other.

In FIG. 21, the basic structure of the first bent portion molding device 211A on the left side is the same as the first bent portion molding device 6A shown in FIG. 6. A difference is that a lateral mold part 212AY is installed outside a lower mold part 212Aa and an upper mold part 212Ab positioned in the vertical direction for producing an H-shaped molding. The lower mold part 212Aa is fixed to a base 2111A. The upper mold part 212Ab is connected with an actuator 218A, so that it can be pressed against and separated from the lower mold part 212Aa via the strip-like laminate. The lateral mold part 212AY is connected with an actuator 218AY, so that it can be pressed against and separated from the lower mold part 212Aa and the upper mold part 212Ab via the strip-like laminate.

In FIG. 21, the basic structure of the second bent portion molding device 211B on the right side is the same as the second bent portion molding device 6b shown in FIG. 7. A difference is that a lateral mold part 212BY is installed outside a lower mold part 212Ba and an upper mold part 212Bb positioned in the vertical direction, to produce an H-shaped molding. The lower mold part 212Ba is fixed to a base 2111B. The upper mold part 212Bb is connected with an actuator 218B, so that it can be pressed against and separated from the lower mold part 212Ba via the strip-like laminate. The lateral mold part 212BY is connected with an actuator 218BY, so that it can be pressed against and separated from the lower mold part 212Ba and the upper mold part 212Bb via the strip-like laminate. The second bent portion molding device 211B has an inter-bent-portion distance changing means 21 with a similar constitution to that of the second bent portion molding device 6b shown in FIG. 7. The detailed explanation of the inter-bent-portion distance changing means 21 is omitted here.

Figure 22:
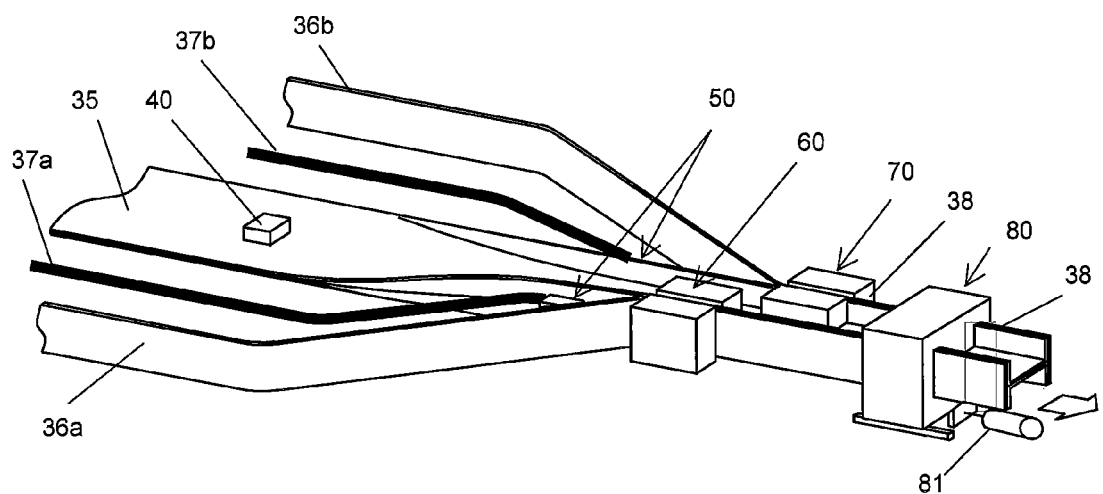
FIG. 22 is a schematic perspective view of an apparatus for producing a reinforcing fiber molding H-shaped in cross sectional form with corner fillers, according to an embodiment of the invention.

FIG. 22 shows an apparatus for producing an H-shaped molding. The main components of the apparatus are a non-bent portion press device (web heating and pressurizing means) 40, a filler molding device 50, a first bent portion molding device 60, a second bent portion molding device 70 and a hauling device (carrying device) 80.

Meanwhile, in this case, for the convenience of explanation, the central horizontal portion of the H-shaped molding is called a web portion and the vertical portions on both sides are called flange portions.

Figure 23:
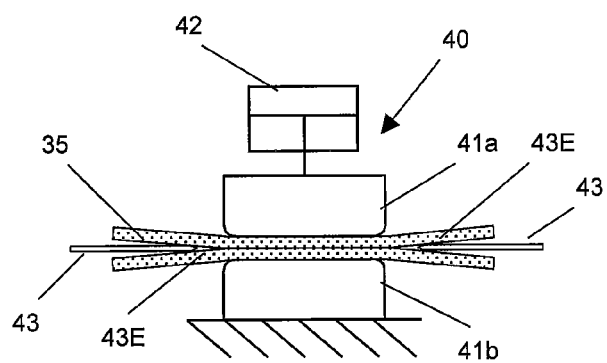
FIG. 23 is a cross sectional view showing an example of the edge separating means used in the production apparatus of FIG. 22.

The constitution of the apparatus is explained below in detail. The non-bent portion press device 40 presses the non-bent portion (flat portion) corresponding to the central web portion of the H-shaped cross sectional form. A cross sectional view of the non-bent portion press device 40 is shown in FIG. 23. In FIG. 23, the laminate 35 is held between the flat surface of a mold part 41a and the flat surface of a mold part 41b. The mold part 41b is fixed to a stationary base not shown in the drawing. The mold part 41a is connected with an actuator 42, so that it can be pressed against and separated from the mold part 41b.

Further, at left and right positions slightly apart from the mold, separation guides 43 are installed for separating the laminate 35 into two layers in the thickness direction for preventing the layers from being brought into contact with each other. The step for separating the laminate into upper and lower layers along one edge or both edges of the laminate 35, for example, using a separation guide(s) 43 is the edge separating step. At the point where the separated layers remain connected with each other, a branch corner 43E is formed.

Figure 24:
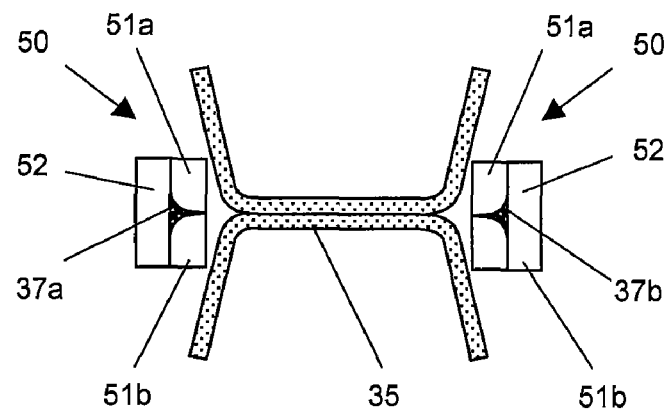
FIG. 24 is a cross sectional view showing an example of the corner filler supplying means used in the production apparatus of FIG. 22.

Two filler molding devices 50 of the same structure are arranged on the left and right sides. The cross sectional view of the filler molding devices is shown in FIG. 24. In FIG. 24, two radiused mold parts 51a and 51b and a flat mold part 52 are combined to form each of the filler molding devices having a hole with a cross sectional form identical with the cross sectional form of the corner filler in the intended H-shaped cross section. A corner filler 37a or 37b is passed through the hole, so that it can be transformed to have the form of the hole. This hole is wide on the inlet side in the corner filler progress direction, and has the desired cross sectional form inside.

Figure 25:
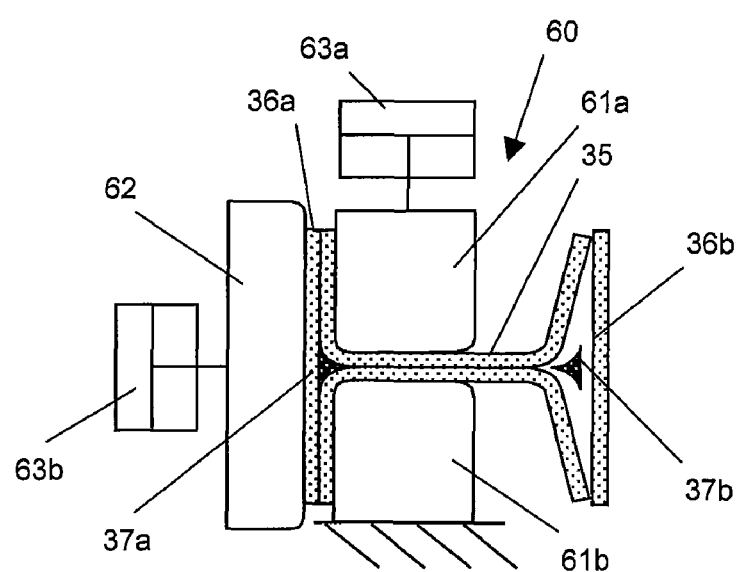
FIG. 25 is a cross sectional view showing an example of the first bent portion molding device used in the production apparatus of FIG. 22.

A first bent portion molding device 60 molds one of the two T-shaped bent portions constituting the H-shaped cross sectional form, and the cross sectional view of the first bent portion molding device 60 is shown in FIG. 25. In FIG. 25, a lateral mold part 62 is arranged beside two central mold parts 61a and 61b. The clearance of these three mold parts forms a T-shaped sectional form lying sideways. The central mold part 61b is fixed to a stationary base not shown in the drawing, and the central mold part 61a and the lateral mold part 62 are connected with actuators 63a and 63b respectively, so that they can be pressed against and separated from the central mold part 61a.

Figure 26:
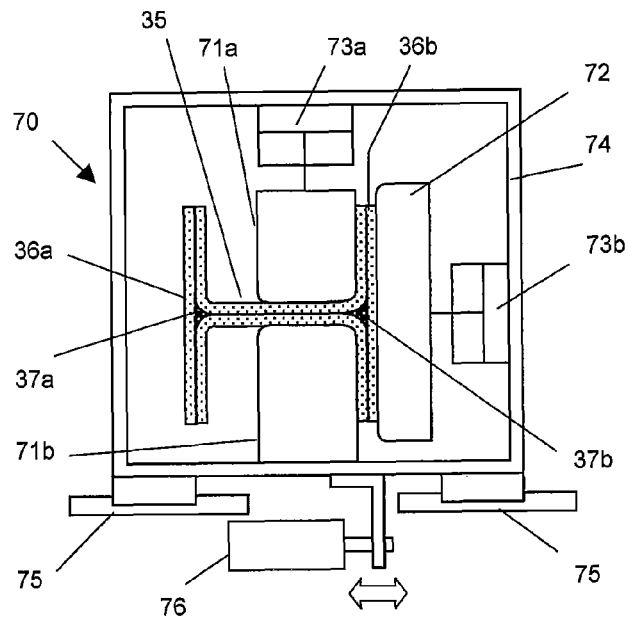
FIG. 26 is a cross sectional view showing an example of the second bent portion molding device used for producing a reinforcing fiber molding in which the width of the web portion changes in the longitudinal direction in the production apparatus of FIG. 22.

A second bent portion molding device 70 molds the other bent portion than the one molded by the first bent portion molding device 60, and the cross sectional view of the second bent portion molding device 70 is shown in FIG. 26. FIG. 26 shows a structure in which a lateral mold part 72 is arranged beside two central mold parts 71a and 71b. The clearance of these three mold parts forms a T-shaped sectional form lying sideways as in the case of the first bent portion molding device 60. The central mold part 71b is fixed to an outer frame 74. The central mold part 71a and the lateral mold part 72 are respectively connected with actuators 73a and 73b fixed to the outer frame 74, so that they can be pressed against and separated from the central mold 71a.

The outer frame 74 is connected with an actuator 76, so that the mold parts constituting the second bent portion molding device 70 and a set of the actuators for driving the mold parts can be moved to arbitrary positions in the horizontal direction perpendicular to the longitudinal direction of the device, being guided by a guide 75.

The detail of a hauling device 80 is not shown in the drawings. It comprises multiple mold parts and actuators for driving them, and can hold an H-shaped molding. Further, there is a structure in which the mechanism for holding the molding can be reciprocated as a whole by an actuator 81 in the longitudinal direction.

Further, in this embodiment, as in the aforementioned embodiments, hot water can be circulated in the respective mold parts, as a function to adjust the temperatures of the respective mold members to desired levels.

Next, the method for actually producing an H-shaped molding using the above production apparatus is explained below in reference to FIG. 22 and also to the detailed sectional views of the respective components of the apparatus such as FIGS. 23, 24, 25 and 26.

At first, a strip-like laminate 35 as the material to be molded, outside flange members 36a and 36b respectively formed of a similar strip-like laminate and corner fillers 37a and 37b respectively formed of a reinforcing fiber bundle are passed through the entire length of the production apparatus with the molds kept open, to obtain the initial state.

Then, the operation of the apparatus is started. The hauling device 80 holds the laminate and the corner fillers and hauls and carries them toward the downstream side of the apparatus (toward the right side in FIG. 22). After stop of hauling, the non-bent portion press device 40, the first bent portion molding device 60 and the second bent portion molding device 70 respectively process the material. The carrying operation and the processing operation are alternately performed. Thus, a molding H-shaped in the cross sectional form is gradually formed toward the downstream, and after the material has been perfectly passed through the entire length of the apparatus, the intended molding H-shaped in cross sectional form can be stably and continuously produced.

The flow of material processing is explained below in further detail in the order from the upstream side. At first, the laminate 35 is introduced by the hauling force of the hauling device 80 into the non-bent portion press device 40. At this moment, both the edges of the laminate 35 are separated into respectively two layers in the thickness direction by the separation guides 43, and the respective two layers on both sides are supported not to contact with each other. Then, the mold part 41a is driven by the actuator 42, to be moved against the mold part 41b, for closing the mold, to press the web portion not to be bent in the final H-shaped section. Simultaneously, heat is supplied to the mold parts for heating them, and this state is held for a certain period of time. Thus, the resin as the laminate maintaining material contained in the laminate 35 reliably bonds the reinforcing fiber sheets to each other to decrease the voids in the laminate, for raising the fiber volume content, thus retaining the shape.

Subsequently after completion of holding for a certain period of time, the mold part 41a is driven by the actuator 42, to open the mold. Then again, the hauling device 80 carries the laminate 35 pressed in the web portion downward. The range pressed here is not necessarily required to be the entire range corresponding to the web, and only a portion of the web is required to be pressed. As described before, especially in the case where the distance between the bent portions is long, namely, in the case where the width of the web portion is long as in this embodiment, it is effective to positively press the central portion of the web, which is unlikely to be heated and pressurized by the bent portion molding devices in the following steps. Further, if the reinforcing fiber sheets are positively bonded to each other, such a trouble that the sheets slip each other in the subsequent steps can be prevented.

On the other hand, each of the corner fillers 37a and 37b is carried by the hauling device 80 and passed through the hole formed by the radiused mold parts 51a and 51b and the flat mold part 52 of each of the filler molding devices 50. The respective mold parts are heated, and the hole is wide on the inlet side and has a cross sectional form inside, which is identical with the cross sectional form of the corner filler in the intended H-shaped cross section. Therefore, the resin ingredient contained in the corner filler material is softened to allow transformation. Thus, the corner fillers 37a and 37b have the cross sectional forms identical with the cross sectional forms of the branch corners 43E in the intended H-shaped cross section and are delivered from the filler molding devices 50. As described here, since the corner fillers have been molded for adaptation to the finally assumed sectional forms of the branch corners 43E when the T-shaped bent portions are molded later by the bent portion molding devices, it does not happen that the corner fillers are pressed out to the flat portions other than the branch corners or deviate to be uneven in density. The corner fillers can be reliably accommodated in the intended positions.

Further, since the filler molding devices 50 are installed near the branching portions where both the edges of the laminate 35 are opened into two layers in the thickness direction respectively as shown in FIG. 25, the corner fillers 37a and 37b with higher stiffness after having been molded by the filler molding devices 50 can be introduced into the bent portion molding devices 60 and 70 in the subsequent steps while the corner fillers 37a and 37b retain their forms with their bending kept as small as possible.

Then, the laminate 35 is supplied into the first bent portion molding device 60 together with the laminate (outside flange member) 36a destined to be a cap positioned outside the flange portions constituting the H-shaped cross sectional form. At this moment, at first, the actuator 63a drives the central mold part 61a, to press the web portion constituting the H-shaped cross sectional form in the region close to the flange portions on one side (left side in FIG. 25). Subsequently, the actuator 63b drives the lateral mold part 62, to press the flange portions on one side (left side in FIG. 25) constituting the H-shaped cross sectional form, and this state is held for a certain period of time.

Since these mold parts are heated by a heating medium flowing inside, the laminates 35 and 36a and the corner filler 37a are heated, and the resin as the laminate maintaining material contained in the laminate 35 bonds the reinforcing fiber sheets constituting the laminates to each other and bonds these laminates and the corner filler to each other, the voids in the laminates 35 and 36a being decreased to raise the fiber volume content, for retaining the shape. Thus, the T-shape sectional portion on the left side of the intended H-shaped sectional form can be obtained.

Then, the laminate 35 is introduced into the second bent portion forming device 70 together with the corner filler 37b and the laminate 36b destined to be a cap positioned outside the flange portions constituting the H-shaped cross sectional form. As in the case of the first bent portion molding device, the actuator 73a drives the central mold part 71a, to press the web portion constituting the H-shaped cross sectional form in the region close to the flange portions on one side (right side in FIG. 26). Subsequently, the actuator 73b drives the lateral mold part 72, to press the flange portions on one side (right side in FIG. 26) constituting the H-shaped cross sectional form, and this state is held for a certain period of time. Thus, the T-shape sectional portion on the right in the intended H-shape sectional form can be obtained. Thus, the final H-shape section is obtained to complete a segment of the H-shaped molding 38.

The segment of the completed H-shaped molding 38 is sent further downstream and held by the hauling device 80. Further, the held mechanism as a whole is moved downstream by the actuator 81 together with the H-shaped molding 38. Subsequently, the H-shaped molding 38 is released, and the actuator 81 again woks to move the holding mechanism as a whole upstream, the segment of the H-shaped molding 38 being left downstream. This operation is repeated to send the completed segments of the H-shaped molding to downstream. According to the abovementioned series of production steps, a molding having H-shaped cross sectional form is continuously produced without interruption, unless the material is cut.

A feature of this embodiment is that a T-shaped bent portion can be molded by one step without undergoing multiple steps of once producing moldings respectively with a bent portion attached to a laminate and subsequently bonding these moldings in a later step. Thus, an apparatus that can produce an H-shaped molding with a simple equipment constitution can be made. Further, as described as the feature of the invention, the bent portions can be molded respectively by individual bent portion molding devices, and the second bent portion molding device for molding one bent portion can be moved to an arbitrary position in the horizontal direction perpendicular to the longitudinal direction of the apparatus by the actuator 76. Therefore, the change of the sectional form and the change of the distance between the flanges of H shape in case of this embodiment can be easily realized without complicated work such as change of molds.

While the laminate 35 delivered from the non-bent portion press device 40 reaches the first bent portion molding device 60 and the second bent portion molding device 70, it has its both edges separated into two layers respectively and opened to be bent upward and downward. In the case where the laminate is soft and likely to be bent, the laminate can be naturally bent while it is fed in the longitudinal direction. However, in the case where the laminate 35 is highly stiff, it is unlikely to be bent naturally. Therefore, in this case, it is preferred to install means for forcibly opening and bending the edges of the laminate.

In the case where the laminate maintaining material contained in the laminate is a thermoplastic resin, if the laminate or molding that is delivered from the first bent portion molding device 60 or the second bent portion molding device 70 retains the high temperature caused by pressing, the repulsion of the compressed reinforcing fibers causes the laminate or molding with the intended sectional form as produced by the bent portion molding devices to swell in the thickness direction or causes the bent portions to return to a straight direction as a spring-back phenomenon, since the viscosity of the resin is low. As a method for preventing it, it is preferred to install cooling means near downstream of the bent portion molding devices. The cooling means can be, for example, means of blowing cold air or means of bringing the laminate or molding into contact with a cold plate, etc.

Figure 27:
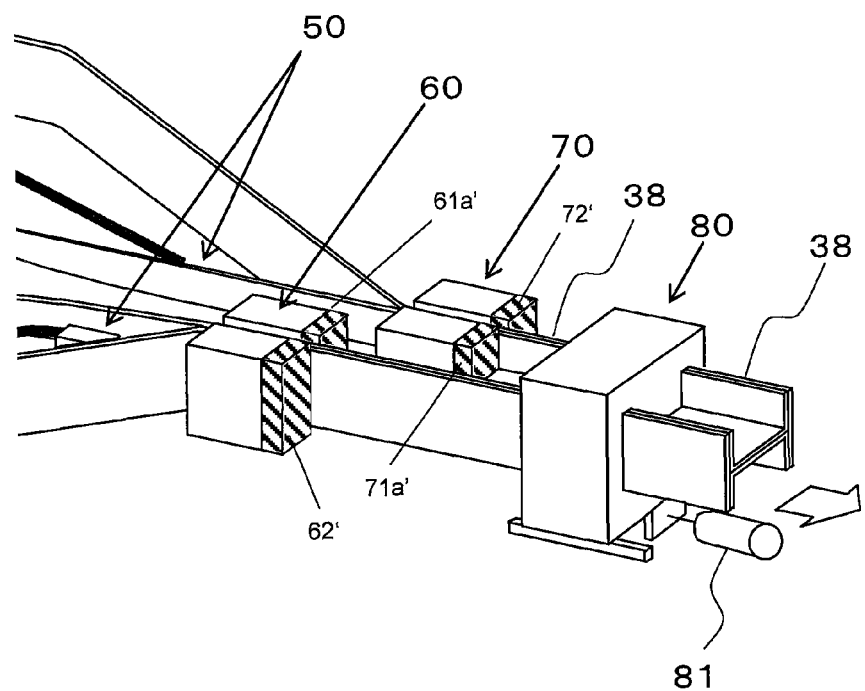
FIG. 27 is a schematic perspective view of the reinforcing fiber molding producing apparatus of FIG. 22, in which one each cooling means for cooling the molding is added to the first bent portion molding device and the second bent portion molding device.

Especially preferred means are shown in FIG. 27. FIG. 27 illustrates details around the bent portion molding devices. In FIG. 27, downstream of the mold parts 61a, 61b, 62, 71a, 71b and 72 (see FIGS. 25 and 26) constituting the first bent portion molding device 60 and the second bent portion molding device 70, cooling mold parts 61a', 62', 71a' and 72' (shown by shading, 61b' and 71b' are not shown in the drawing) with the same sectional forms at the faces in contact with the abovementioned mold parts and the laminate are attached adjacently, so that they can be moved together with the mold parts constituting the bent portion molding devices.

The cooling mold parts can be, for example, such that a coolant such as cold air or cold water is passed inside the mold parts. In this mode, the laminate or molding heated and pressed by hot mold parts is fed downstream to be immediately pressed and cooled by the cooling mold parts. Thus, the spring-back phenomenon can be prevented, and a high fiber volume content and a highly accurate sectional form compared with the intended form can be achieved.

Figure 28:
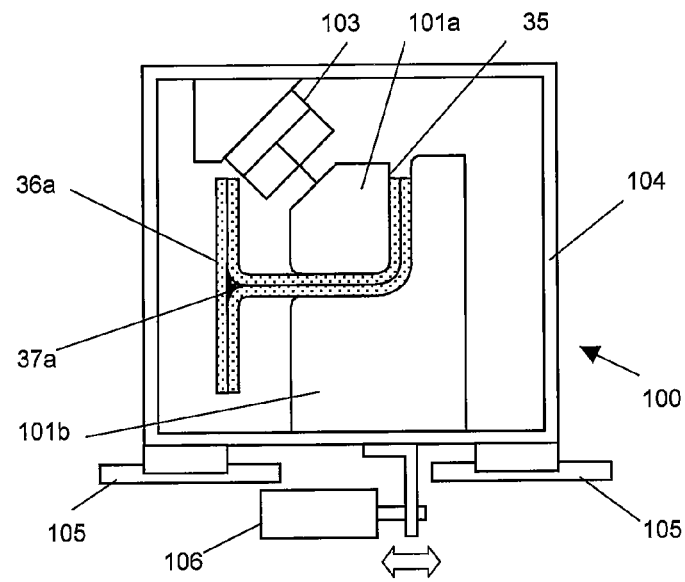
FIG. 28 is a cross sectional view showing an example of the second bent portion molding device used in an embodiment of the invention for producing a reinforcing fiber molding J-shaped in cross sectional form, in which the width of the web changes in the longitudinal direction.

According to the abovementioned method, a molding having J-shaped sectional form can also be produced. In this case, it is only required to slightly change the structure of the second bent portion molding device 70. The cross sectional view of the changed structure is shown in FIG. 28. In the second bent portion molding device 100 used for obtaining the J-shape cross sectional form, an upper mold part 101a and a lower mold part 101b are used to form an L-shaped clearance, and the laminate is fitted in the clearance. If the upper mold part 101a is driven by an actuator 103 for pressing, the L-shaped bent portion can be molded. For actually obtaining a J-shaped molding, in the abovementioned process for producing an H-shaped molding, the laminate having a T-shaped sectional portion on the left side and delivered from the first bent portion molding step 60 is introduced alone into the second bent portion molding device 100 without accompanying the corner filler 37b and the laminate (outside flange member) 36b destined to be a cap, and is pressed on the right side, to mold an L-shaped bent portion, for completing a J-shaped molding.

Also in these methods for efficiently producing an H-shaped or J-shaped molding, a molding in which the distance between the bent portions in the vertical section changes in the longitudinal direction depending on the position in the longitudinal direction that is a characteristic effect of the invention, can be produced. As an example, a method for producing an H-shaped molding in which the distance between the flange portions changes at a constant rate like a taper is explained below in reference to FIG. 29.

Figure 29:
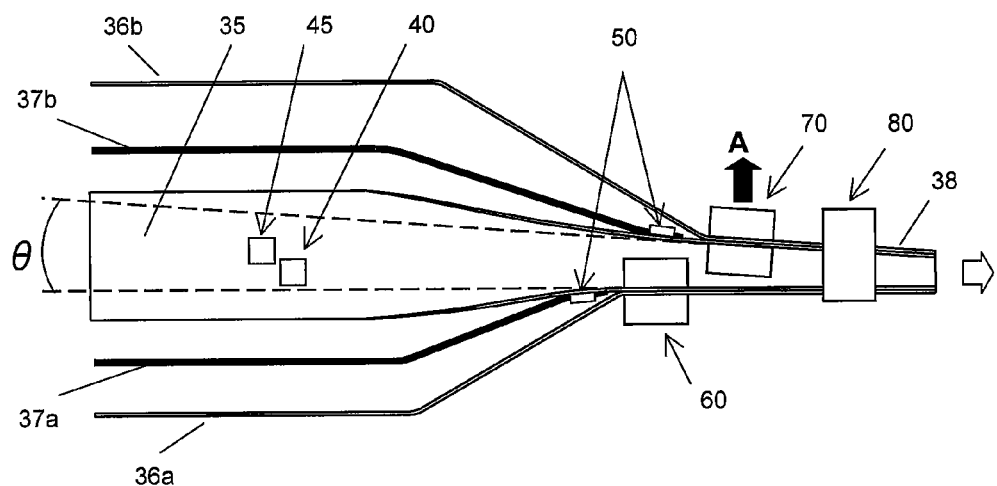
FIG. 29 is a schematic plan view showing an example of a reinforcing fiber molding producing apparatus, as a modified embodiment of the production apparatus of FIG. 22, used for producing a reinforcing fiber molding in which the width of the web portion changes in the longitudinal direction.

FIG. 29 is a top view showing an apparatus for producing a tapered H-shaped molding. In FIG. 29, a large difference from the apparatus for producing an H-shaped molding explained before is that the ridgeline of the mold of the second bent portion molding device 70 is arranged with an angle of θ against the ridgeline of the mold of the first bent portion molding device 60. As explained in reference to FIGS. 13 and 14 for the embodiment explained before, also in this apparatus, with the feed distance of the hauling device 80 per each time as L, whenever the laminate or molding is fed by distance L, the second bent portion molding device 70 is moved by L×tan θ in the direction perpendicular to the longitudinal direction and in the direction leaving from the first bent portion molding device 60, namely, in the direction indicated by a thick solid arrow A in FIG. 29, to keep continuously straight the ridgeline of the second bent portion molding device 70 for molding the bent portion. Thus, an H-shaped molding having a taper angle of θ in the distance between the flanges can be produced and discharged in the longitudinal direction.

Figure 30:
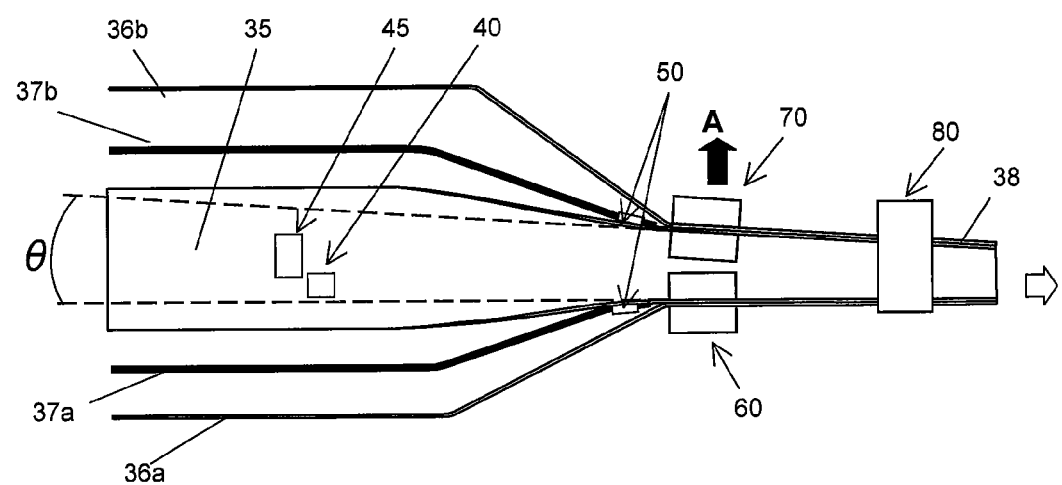
FIG. 30 is a schematic plan view showing another example of a reinforcing fiber molding producing apparatus, as a modified embodiment of the production apparatus of FIG. 22, used for producing a reinforcing fiber molding in which the width of the web portion changes in the longitudinal direction.

In the case where a tapered molding is produced, there may remain a local web portion that cannot be pressed by any of the non-bent portion press device or two bent portion molding devices when the distance between the flanges is large. In this case, it is desirable to install a second non-bent portion press device 45 adjacently to the non-bent portion press device 40 on the side where the web expands due to the taper angle θ as shown in FIG. 30, for pressing the local range where the non-bent portion press device 40 cannot press.

Further, the first bent portion molding device can have a similar taper angle and be moved as described before, so that taper angles can be established on both the sides, as in the embodiment described before.

Furthermore, if the filler molding devices 50 are stationary while the bent portion molding devices 70 and 80 can be moved according to the change in the distance between the flanges, there arises a problem that the filler molding devices 50 may interfere with the laminate 35, etc. Therefore, it is preferred that the filler molding devices 50 can be moved together with the bent portion molding devices 70 and 80.

It is preferred that the molds used for carrying out the invention are made of a metal having good heat conductivity. In the case where the strip-like laminate to be molded contains a sticky resin, a phenomenon that the laminate adheres to the molds may occur. If there is such a possibility, it is preferred that at least the surfaces of the molds are formed of a material unlikely to cause such adhesion or capable of releasing the sticky resin even if such adhesion occurs. For example, it is preferred to coat the surfaces of the molds with polytetrafluoroethylene (Teflon (registered trademark)) or to coat the surfaces of the molds with a generally used releasing agent.

A further other method for avoiding the adhesion of the strip-like laminate to the molds is to use generally used releasing paper (releasing film). If a strip-like releasing paper sheet (releasing film) is positioned along the surface of the strip-like laminate and they are supplied to a mold together, then the adhesion of the strip-like laminate to the mold can be avoided. This method is especially effective in the case where the strip-like laminate is formed of prepreg sheets.

It is preferred that the introducing guide 4 used for carrying out the invention is formed of a metallic plate. The reason is that in the case where an initially flat strip-like laminate is supplied to a mold while it is transformed to suit the form of the mold, the introducing guide 4 can be easily transformed to have a cross sectional form suitable for such transformation.

It is preferred that the positioning guide 5 used for carrying out the invention is formed of a metallic plate or metallic block. The positioning guide 5 decides the relation between the position of the mold and the position of the strip-like laminate. Therefore, it is preferred that the positioning guide 5 is attached to the introducing guide 4 so that the position of the positioning guide 5 can be adjusted in reference to the introducing guide 4 as preparedness for responding to the change in the width of the laminate. The positional adjustment can be performed, for example, by using screwing slots formed in the positioning guide 5 or in the introducing guide 4 and fastening screws.

It is preferred that the discharge guide 6 used for carrying out the invention is formed of a metallic plate having a cross sectional form partially similar to the cross sectional form of the produced reinforcing fiber molding. The reinforcing fiber molding delivered from the molds is likely to be deformed or buckled. The discharge guide 6 serves to prevent the deformation and buckling. In the case where the length of the produced and carried reinforcing fiber molding is long, it is desirable that the discharge guide 6 has a length suitable for the reinforcing fiber molding or comprises multiple guides arranged with gaps kept between them.

In the case where reinforcing fiber sheets with a thermoplastic resin scattered therein, namely, dry fabric sheets are used as the strip-like laminate for carrying out the invention, the dry fabric sheets usually do not have tackiness at room temperature. In this case, if the multiple reinforcing fiber sheets are merely layered, the laminate is likely to be loose and is difficult to handle. In such a case, it is preferred that, for example, an iron or soldering iron is used to heat and pressurize the laminate at numerous points with intervals, for lightly bonding the multiple reinforcing fiber sheets by a resin. However, if the sheets are entirely bonded, the sheets are unlikely to slip each other, and when a bent portion is molded, the laminate is likely to be wrinkled. Therefore, it is preferred that the bonding is partial. If the bonding is partial, the strip-like laminate can be bent along the introducing guide.

As the reinforcing fiber sheets used for carrying out the invention, carbon fiber sheets or glass fiber sheets can be preferably used. The sheets can be, for example, woven fabric sheets, knitted fabric sheets, or unidirectional sheets in which fibers are arranged in one direction. The fibers in the unidirectional sheets may be arranged, for example, in a direction of 0°, +45°, −45° or 90°. These sheets different in fiber direction can be laminated to prepare a pseudo-isotropic laminate.

In the case where dry fabric sheets are used as the reinforcing fiber sheets for carrying out the invention, commercially available sheets can be used. As resins that can be deposited in the dry fabric sheets, polyester resins, polyolefin resins, styrene-based resins, polyamide resins, polyurethane resins, etc. are known.

EXAMPLES

Example 1

The production apparatus shown in FIG. 1 was used to produce a preform 7A having a constant sectional form as shown in FIGS. 4 and 5. The length 7a of the preform 7A was 2,000 mm, and the outer height 7c of the flange portions was 45 mm, the outer width 7b of the web portion being 45 mm.

The upper mold part 2Ab and the lower mold parts 2Aa of the first mold 2A and the upper mold part 2Bb and the lower mold part 2Ba of the second mold 2B were arranged to ensure that the length of respective mold parts in the carrying direction of the laminate 3 became 120 mm, that the angle of the respective bent portions BN1 and BN2 became 90°, and the material of the respective mold parts was carbon steel S45C. The surface of the respective mold parts was coated with a polytetrafluoroethylene-based resin (Teflon (registered trademark)), to enhance releasability. The respective mold parts were internally provided with a temperature control means, to control the mold temperature at 90° C. The distance between the first mold 2A and the second mold 2B was 1,000 mm.

As a reinforcing fiber sheet for composing a strip-like laminate 3, an unidirectional woven fabric (unit-area weight 190 g/m$^2$) comprising reinforcing fibers arranged in one direction of the warp direction and the weft yarns provided with a pitch of 5 mm was prepared. As the reinforcing fibers, Torayca T800G (registered trademark) produced by Toray Industries, Inc. was used. As the weft yarn, a yarn having a fineness of 1.7 tex formed with seven polyamide filaments was used. As a laminate maintaining material, polyamide resin particles having a low melting point (melting point 110° C., average particle size 100 μm) was used. The polyamide resin particles were deposited on one side surface of the reinforcing fiber sheet with a weight of 20 g/m$^2$.

The obtained woven fabric was cut by a rotary knife type hand cutter, to obtain four kinds of strips different in reinforcing fiber direction angle (0°, 45°, −45° and 90° in reference to the longitudinal direction of the strip) (140 mm wide, 2,000 mm long). Then, these strips were layered on a flat table, to obtain a strip-like laminate comprising 7 layers with the reinforcing fiber directions of 45°/0°/−45°/90°/−45°/0°/45° in the order from the bottom layer.

The laminate 3 obtained by merely overlaying the strips could separate sheet by sheet, curl and shift, being difficult to handle. Therefore, for better handling convenience, the laminate was placed on a heating plate and heated to about 80° C., while a soldering iron was used to partially heat the laminate, for melting the polyamide resin particles having the low melting point, for achieving temporary adhesion.

In this case, if the laminate as a whole was bonded with a resin, the sheets did not shift, not allowing the laminate to be molded well. Therefore, the tip of a disc-shaped soldering iron having a diameter of 10 mm was applied to 5 places each in the width direction (the center in the width direction and at the positions of 30 mm and 60 mm in the width direction from the center) at a pitch of 30 mm in the longitudinal direction with a pressure of 0.1 MPa for achieving partial adhesion. Further, lest the laminate should adhere to the soldering iron, a releasing sheet was placed between the laminate and the soldering iron, when the thermal adhesion was performed. Thus, a strip-like laminate 3 was obtained.

Next, as a leading fabric, a strip-like polyester nonwoven fabric as wide as the laminate 3 was stuck at the tip of the laminate 3 in the longitudinal direction thereof with a heat resistant tape. The leading fabric was passed through the first bent portion molding device 1A and the second bent portion molding device 1B of FIG. 1, and gripped by a hauling device (not shown in the drawing) installed on the downstream side (right side in FIG. 1) in the longitudinal direction of the production process. The leading fabric was twisted during transfer between the first bent portion molding device 1A and the second bent portion molding device 1B so that the bent portion to be molded by the second mold 2B might suit the groove ridgeline of the lower mold part 2Ba.

Then, the first mold 2A and the second mold 2B were closed, and the laminate 3 was pressed at a pressure of 0.4 MPa for 5 minutes. Subsequently the first mold 2A and the second mold 2B were opened, and during the duration, the hauling device was used to haul the leading fabric and the laminate 3 connected with it toward the downward side by 100 mm. The pressing operation and the hauling operation were alternately performed.

By these operations, the laminate 3 was gradually fed into the first mold 2A and the second mold 2B in succession to the leading fabric, and processed to mold the first bent portion by the first mold 2A and to mold the second bent portion by the second mold 2B. At the moment when the entire length of the laminate 3 was delivered from the second mold 2B, a preform 7 having a length of 2,000 mm was produced.

Meanwhile, if the pressed laminate 3 was sent toward downstream by opening the molds in this state, the laminate 3 could adhere to the molds and could not be separated from the molds, owing to the action of the adhesive resin. Therefore, whenever each mold was opened, an air nozzle was used to blow a jet into the clearance between the mold and the laminate, for separating the laminate from the mold.

Finally for ensuring a correct size, the preform 7 was trimmed at the end by a rotary knife type hand cutter, to complete the long preform 7A having a certain sectional form as shown in FIGS. 4 and 5.

The completed preform 7A stood comparison with the preform obtained by a conventional technique of forming the two bent portions by one bent portion molding means in dimensional accuracy such as wall thickness and straightness. Further, it was confirmed that the CFRP produced by injecting a matrix resin into the preform 7A by RTM process and curing did not have any problem in view of strength.

Example 2

The apparatus for producing a reinforcing fiber molding shown in FIG. 12 was used to produce a tapered preform 7C shown in FIG. 15. The length 7a of the preform 7C was 2,000 mm, and the outer height 7c of the flange portions was 45 mm. The outer width 7b2 of the web portion in the narrow portion was 45 mm, and the outer width 7b3 of the web portion in the wide portion was 65 mm. In the produced molding, the web portion changed in width at a taper ratio of 1/100, namely, {the variation in the width of web portion (65−45) mm}/(length 2,000 mm)=1/100.

The upper mold part 122Ab, the lower mold part 122Aa, the upper mold part 122Bb and the lower mold part 122Ba were arranged, as in Example 1, to ensure that the length of the laminate 3 in the carrying direction was 120 mm, that the angles of the bent portions BN1 and BN2 became 900, and that the material of the molds was carbon steel S45C. The respective mold parts were coated with a polytetrafluoroethylene-based resin (Teflon (registered trademark)), to enhance releasability. The respective mold parts were internally provided with a temperature control means, to control the mold temperature at 90° C. The distance between the first mold 121A and the second mold 121B was 1,000 mm. The production method was the same as in Example 1, except the following conditions.

In preparation for the taper, the strip-like laminate 3 had a width of 160 mm and a length of 2,000 mm. The production apparatus used was the reinforcing fiber molding producing apparatus shown in FIG. 12. The ridgeline 32a of the mold for molding the first bent portion was made parallel with the longitudinal direction (feed direction) of the laminate 3. The first mold 121A and the second mold 121B were arranged to ensure that the ridgeline 32b of the mold for molding the second bent portion was inclined to have a taper angle of θ (tan θ=1/100) in reference to the longitudinal direction of the laminate 3.

Further, as described in Example 1, the laminate 3 having a leading fabric connected was passed through the first bent portion molding device 121A and the second bent portion molding device 121B, and the pressing operation and the hauling operation were alternately performed. In these operations, a bent portion parallel to the longitudinal direction was molded by the first mold 122A, and a bent portion having an inclination of taper angle θ in reference to the longitudinal direction was molded by the second mold 122B. As a result, a tapered preform 7C having a length of 2,000 mm was produced.

Meanwhile, in this production process, the position of the second mold 121B was moved as required in the direction perpendicular to the longitudinal direction, to let the second mold draw a straight ridgeline for the second bent portion in the preform 7C. That is, the position of the second mold 121B was adjusted to ensure that the start point of the second bent portion might be apart from the start point of the first bent portion by 45 mm when the laminate 3 fed from upstream was first pressed by the second mold 121B, and thereafter, whenever the laminate 3 was fed by 100 mm, the second mold 121B was moved by 1 mm to let the ridgeline 32b of the second mold be farther away from the ridgeline 32a of the first mold in the direction perpendicular to the longitudinal direction.

Finally for ensuring a correct size, as shown in FIG. 18, the edge 16F1t of the molded preform 7C was trimmed, to complete a tapered preform 7C in which the cross sectional form shown in FIG. 17 continued in the longitudinal direction.

The completed preform 7C had no problem in dimensional accuracy such as wall thickness and straightness desired as a preform to be provided for a subsequent process of RTM. Further, as in Example 1, it was confirmed that the CFRP produced by injecting a matrix resin into the preform 7C by RTM process and curing had no problem in view of strength.

INDUSTRIAL APPLICABILITY

According to the reinforcing fiber molding producing method or apparatus of the invention, different bent portions of a strip-like laminate formed of layered multiple reinforcing fiber sheets are molded one after another in the strip-like laminate by respectively independently arranged two molding steps (devices) for forming mutually different bent portions. Therefore, in the case where multiple reinforcing fiber moldings different in the distance between the bent portions are produced in the same process, the work of exchanging molds for each distance is not required. Further, a reinforcing fiber molding in which the width of the web portion (the distance between the adjacent bent portions) changes in the longitudinal direction can be produced in a short time at low cost. Variously formed reinforcing fiber moldings can be produced by changing the position of one mold.

Such reinforcing fiber moldings and fiber-reinforced plastic (FRP) moldings produced from them can be used as structural members of motor vehicles and aircraft.

The invention claimed is:

1. A method for producing a reinforcing fiber molding obtained by molding a strip-like laminate comprising layered multiple reinforcing fiber sheets and a laminate maintaining material for maintaining the layered state, wherein the molding has at least two bent portions in a sectional form perpendicular to a longitudinal direction of said strip-like laminate, has a web portion formed between the ends of the adjacent bent portions, and has at least two flange portions protruding from the web portion via the bent portions, the method comprising:

(a) supplying said strip-like laminate,
(b) producing the at least two bent portions in said strip-like laminate, and
(c) intermittently carrying said strip-like laminate located continuously in a region from said supplying step (a) to said bent portion producing step (b), wherein
(d) said bent portion producing step (b) comprises respectively independent at least two bent portion molding steps provided at different positions in the direction for carrying said strip-like laminate,
(e) said at least two bent portion molding steps include a first bent portion molding step positioned on an upstream side and a second bent portion molding step positioned downstream of said first bent portion molding step, and
(f) said first bent portion molding step includes molding at least one bent portion of the at least two bent portions, and said second bent portion molding step includes molding at least one bent portion of the at least two bent portions other than the bent portion molded by said first bent portion molding step,
wherein said first bent portion molding step and/or said second bent portion molding step includes changing the distance between at least two bent portions in the sectional form in the longitudinal direction of said strip-like laminate,
wherein said first bent portion molding step is performed with a first mold comprising two mold parts facing each other for holding and pressurizing said strip-like laminate between them to mold a bent portion and said second bent portion molding step is performed with a second mold comprising two mold parts facing each other for holding and pressurizing said strip-like laminate between them to mold another bent portion, and
wherein said step of changing the distance between the at least two bent portions in the sectional form in the longitudinal direction of said strip-like laminate comprises changing the relative distance between said first mold and said second mold by moving one or both of said first mold and said second mold relative to the other.

2. A method for producing a reinforcing fiber molding obtained by molding a strip-like laminate comprising layered multiple reinforcing fiber sheets and a laminate maintaining material for maintaining the layered state, wherein the molding has at least two bent portions in a sectional form perpendicular to a longitudinal direction of said strip-like laminate, has a web portion formed between the ends of the adjacent bent portions, and has at least two flange portions protruding from the web portion via the bent portions, the method comprising:

(a) supplying said strip-like laminate,
(b) producing the at least two bent portions in said strip-like laminate, and
(c) intermittently carrying said strip-like laminate located continuously in a region from said supplying step (a) to said bent portion producing step (b), wherein
(d) said bent portion producing step (b) comprises respectively independent at least two bent portion molding steps provided at the same positions in the direction for carrying said strip-like laminate,
(e) said at least two bent portion molding steps include a first bent portion molding step positioned on one end side in the width direction of said strip-like laminate and a second bent portion molding step positioned on the other end side in the width direction of said strip-like laminate, and said first bent portion molding step and/or said second bent portion molding step includes changing the distance between the at least two bent portions in the sectional form in the longitudinal direction of said strip-like laminate, and (f) said first bent portion molding step includes molding at least one bent portion of the at least two bent portions, and said second bent portion molding step includes molding at least one bent portion of the at least two bent portions other than the bent portion molded by said first bent portion molding step, wherein said first bent portion molding step is performed with a first mold comprising two mold parts facing each other for holding and pressurizing said strip-like laminate between them to mold a bent portion and said second bent portion molding step is performed with a second mold comprising two mold parts facing each other for holding and pressurizing said strip-like laminate between them to mold another bent portion, and wherein said step of changing the distance between the at least two bent portions in the sectional form in the longitudinal direction of said strip-like laminate comprises changing the relative distance between said first mold and said second mold by moving one or both of said first mold and said second mold relative to the other.

3. A method for producing a reinforcing fiber molding according to claim 1 or 2, wherein the distance between the bent portions changes like a taper in the longitudinal direction of said strip-like laminate.

4. A method for producing a reinforcing fiber molding according to claim 1 or 2, wherein said first bent portion molding step and said second bent portion molding step includes include molding the bent portions of said strip-like laminate in such a manner that the two flange portions of the reinforcing fiber molding of two in the number of the bent portions protrude in the same direction in reference to the web portion.

5. A method for producing a reinforcing fiber molding according to claim 1 or 2, wherein said first bent portion molding step and said second bent portion molding step include molding the bent portions of said strip-like laminate in such a manner that the two flange portions of the reinforcing fiber molding of two in the number of the bent portions protrude in different directions in reference to the web portion.

6. A method for producing a reinforcing fiber molding according to claim 1 or 2, wherein an edge of said strip-like laminate, positioned outside the region where the bent portions are molded, is separated in the thickness direction into upper and lower layers, to form two flange portions turned respectively in the other directions, is provided upstream of said first bent portion molding step or upstream of said second bent portion molding step.

7. A method for producing a reinforcing fiber molding according to claim 6, wherein a corner filler formed of a reinforcing fiber bundle is supplied in synchronization with the carrying of said strip-like laminate, to the branch corner formed by separating an edge of said strip-like laminate and supplied from said edge separating step, for positioning the corner filler at the branch corner, and an outer flange member formed of a strip-like laminate different from said strip-like laminate is supplied in synchronization with the carrying of said strip-like laminate, to cover the outer surface of the two flange portions and the outside of the corner filler positioned at the branch corner.

8. A method for producing a reinforcing fiber molding according to claim 1 or 2, wherein an edge of said strip-like laminate positioned outside the region where the bent portions are molded is separated in the thickness direction into upper and lower layers, to form two flange portions turned respectively in the other directions, is provided upstream of said first bent portion molding step and upstream of said second bent portion molding step.

9. A method for producing a reinforcing fiber molding according to claim 8, wherein a corner filler formed of a reinforcing fiber bundle is supplied in synchronization with the carrying of said strip-like laminate, to the branch corner formed by separating an edge of said strip-like laminate and supplied from said edge separating step, for positioning the corner filler at the branch corner, and outer flange member supplying steps in each of which an outer flange member formed of a strip-like laminate different from said strip-like laminate is supplied in synchronization with the carrying of said strip-like laminate, to cover the outer surfaces of the two flange portions and the outside of the corner filler positioned at the branch corner.

10. A method for producing a reinforcing fiber molding according to claim 1 or 2, wherein heating and pressuring such a region of said strip-like laminate, as destined to be the web portion, is provided upstream of said first bent portion molding step.

11. A method for producing a reinforcing fiber molding according to claim 1 or 2, wherein the reinforcing fiber sheets are dry fabric sheets containing the laminate maintaining material composed of a thermoplastic resin dispersedly deposited in the reinforcing fiber sheets; said strip-like laminate is formed of a laminate of the multiple dry fabric sheets; and the produced reinforcing fiber molding is a preform that is later impregnated with a resin, for producing a fiber-reinforce composite material.

12. A method for producing a reinforcing fiber molding according to claim 1 or 2, wherein the reinforcing fiber sheets are prepreg sheets containing the laminate maintaining material composed of an uncured thermosetting resin forming a matrix impregnated into the reinforcing fiber sheets; said strip-like laminate is formed of a laminate of the multiple prepreg sheets; and the produced reinforcing fiber molding is a prepreg to have the uncured thermosetting resin cured later, for producing a fiber-reinforced composite material.

* * * * *